(12) United States Patent
Jones et al.

(10) Patent No.: US 9,003,303 B2
(45) Date of Patent: Apr. 7, 2015

(54) PRODUCTION SCRIPTING IN AN ONLINE EVENT

(71) Applicant: American Teleconferencing Services, Ltd., Atlanta, GA (US)

(72) Inventors: Boland T. Jones, Atlanta, GA (US); David Michael Guthrie, Norcross, GA (US); Nicole C. Santoro, Decatur, GA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 192 days.

(21) Appl. No.: 13/797,228

(22) Filed: Mar. 12, 2013

(65) Prior Publication Data

US 2013/0191763 A1    Jul. 25, 2013

Related U.S. Application Data

(63) Continuation-in-part of application No. 13/822,379, filed as application No. PCT/US2011/058459 on Oct. 28, 2011, said application No. 13/797,228 is a continuation-in-part of application No. 12/789,993, filed on May 28, 2010, which is a continuation of application No. PCT/US2010/033084, filed on Apr. 30, 2010.

(51) Int. Cl.
| | | |
|---|---|---|
| *G06F 3/00* | (2006.01) | |
| *G06F 3/048* | (2013.01) | |
| *H04L 29/06* | (2006.01) | |
| *H04L 12/18* | (2006.01) | |
| *G06F 3/0481* | (2013.01) | |
| *H04L 29/08* | (2006.01) | |
| *H04M 3/56* | (2006.01) | |
| *H04M 7/00* | (2006.01) | |

(52) U.S. Cl.
CPC .......... *H04L 65/403* (2013.01); *H04L 12/1827* (2013.01); *H04M 3/562* (2013.01); *H04M 3/565* (2013.01); *H04M 3/567* (2013.01); *H04M 7/0027* (2013.01); *H04M 2201/38* (2013.01); *H04M 2201/40* (2013.01); *H04M 2201/42* (2013.01); *H04M 2203/2038* (2013.01); *H04M 2203/655* (2013.01); *G06F 3/0481* (2013.01); *G06F 2203/04803* (2013.01); *H04L 67/36* (2013.01); *H04L 67/306* (2013.01); *H04L 12/1822* (2013.01)

(58) Field of Classification Search
CPC .................... G06F 2203/0408; H04L 65/403; H04L 12/1827; H04M 3/567
USPC .......................................... 715/753, 738, 764
See application file for complete search history.

(56) References Cited

U.S. PATENT DOCUMENTS 6,598,075 B1 *   7/2003  Ogdon et al. ................. 709/204
7,672,845 B2 *   3/2010  Beranek et al. ............... 704/251
(Continued)

*Primary Examiner* — David Phantana Angkool
(74) *Attorney, Agent, or Firm* — Smith Risley Tempel Santos LLC

(57) ABSTRACT

Various embodiments of systems, methods, and computer programs are disclosed for producing an online event. One embodiment is a method comprising: creating a production script for an online event comprising an audio conference between one or more speakers and a plurality of listen-only viewers, the production script comprising a series of production prompts associated with a production timeline; a server presenting an event production user interface to an event producer and a viewer user interface to the listen-only viewers, the event production user interface configured to selectively control the viewer user interface during the online event; and presenting, in the event production user interface, the production prompts in accordance with the production timeline during the online event.

24 Claims, 47 Drawing Sheets

(56) References Cited

U.S. PATENT DOCUMENTS

| | | | |
|---|---|---|---|
| 2008/0312760 A1* | 12/2008 | Lee et al. | 700/94 |
| 2011/0032845 A1* | 2/2011 | Agapi et al. | 370/260 |
| 2011/0060591 A1* | 3/2011 | Chanvez et al. | 704/270 |
| 2012/0144302 A1* | 6/2012 | Campanotti et al. | 715/716 |
| 2012/0212626 A1* | 8/2012 | Canova et al. | 348/181 |
| 2013/0290872 A1* | 10/2013 | Hong et al. | 715/753 |
| 2013/0305147 A1* | 11/2013 | McBride et al. | 715/256 |
| 2014/0200888 A1* | 7/2014 | Liu et al. | 704/235 |

* cited by examiner

| PARTICIPANT ID 302 | ROLE 304 | AUDIO STREAM ID 306 |
|---|---|---|
| 302a | PRODUCER | 306a |
| 302b | SPEAKER | 306b |
| 302c | SPEAKER | 306c |
| 302d | VIEWER | 306d |
| 302e | VIEWER | 306e |
| 302f | VIEWER | 306f |

FIG. 22

| ITEM/ACTION | START | END | TYPE | URL | AUTO/PROMPT |
|---|---|---|---|---|---|
| Confirm speaker attendance | | | | | |
| Sound check | | | | | |
| Start event | | | | | |
| Introduce first speaker | | | | | |
| Introduce second speaker | | | | | |
| Play video | | | | | |
| Introduce third speaker | | | | | |
| Q&A | | | | | |
| End event | | | | | |
| Wrap-up | | | | | |

PRODUCTION SCRIPTING IN AN ONLINE EVENT

CROSS-REFERENCE TO RELATED APPLICATIONS

This application is a continuation-in-part patent application of and claims the benefit of the priority of the following co-pending applications: U.S. patent application Ser. No. 13/822,379, entitled "Event Management/Production for an Online Event" and filed on Mar. 12, 2013, which is a U.S. National Stage Application under 35 U.S.C. 371 of International Patent Application Serial No. PCT/US11/58459, entitled "Event Management/Production for an Online Event" and filed Oct. 28, 2011; and U.S. patent application Ser. No. 12/789,993, entitled "Systems, Methods, and Computer Programs for Providing a Conference User Interface" and filed May 28, 2010, which is a continuation filed under 35 U.S.C. 111(a) of International Patent Application Serial No. PCT/US2010/33084, entitled "Systems, Methods, and Computer Programs for Providing a Conference User Interface" and filed Apr. 30, 2010. Each of the above-referenced applications is hereby incorporated by reference in its entirety.

BACKGROUND

Currently, there are a number of conference solutions for enabling people to conduct live meetings, conferences, presentations, or other types of gatherings via the Internet, the public switched telephone network (PSTN), or other voice and/or data networks. Participants typically use a telephone, computer, or other communication device that connects to a conference system. The meetings include an audio component and a visual component, such as, a shared presentation, video, whiteboard, or other multimedia, text, graphics, etc. These types of convenient conference solutions have become an indispensable form of communication for many businesses and individuals.

Despite the many advantages and commercial success of existing conference, meeting, grouping or other types of gathering systems, there remains a need in the art for improved conference, meeting, grouping or other types of gathering systems, methods, and computer programs.

SUMMARY

Various embodiments of systems, methods, and computer programs are disclosed for producing an online event. One embodiment is a method comprising: creating a production script for an online event comprising an audio conference between one or more speakers and a plurality of listen-only viewers, the production script comprising a series of production prompts associated with a production timeline; a server presenting an event production user interface to an event producer and a viewer user interface to the listen-only viewers, the event production user interface configured to selectively control the viewer user interface during the online event; and presenting, in the event production user interface, the production prompts in accordance with the production timeline during the online event.

Another embodiment is a computer program embodied in a computer readable medium and executable by a processor for producing an online event. The computer program comprises logic configured to: create a production script for an online event comprising an audio conference between one or more speakers and a plurality of listen-only viewers, the production script comprising a series of production prompts associated with a production timeline; present an event production user interface to an event producer and a viewer user interface to the listen-only viewers, the event production user interface configured to selectively control the viewer user interface during the online event; and present, in the event production user interface, the production prompts in accordance with the production timeline during the online event.

A further embodiment is a computer system comprising a conferencing system and a server. The conferencing system establishes an audio conference between a plurality of listen-only viewers, an event producer, and one or more speakers, each operating a corresponding computing device connected via a communication network. The server is configured to communicate with the conferencing system and the computing devices. The server comprises one or more processors and an event management/production module, which is stored in memory and executed by the processors. The event management/production module comprises logic configured to: create a production script for an online event associated with the audio conference, the production script comprising a series of production prompts associated with a production timeline; present an event production user interface to an event producer and a viewer user interface to the listen-only viewers, the event production user interface configured to selectively control the viewer user interface during the online event; and present, in the event production user interface, the production prompts in accordance with the production timeline during the online event.

BRIEF DESCRIPTION OF THE DRAWINGS

FIG. 22 illustrates an exemplary confirmation email after a viewer has registered for an online event.

FIG. 26 is a data diagram illustrating an embodiment of a data structure representing an exemplary event production script.

FIG. 32 is a fifth screen shot associated with an embodiment of the event configuration module(s) for viewing viewer details.

DETAILED DESCRIPTION

Various embodiments of systems, methods, and computer programs are disclosed for managing and/or producing an online conference or event. The online event may be used for conferences, meetings, groupings, or other types gatherings (collectively, an online "conference" or "event"). The online conference may be organized, hosted, promoted, produced, or presented by any business, group, individual, or other content provider for any desirable purpose or target audience (e.g., promotional events, online seminars, entertainment broadcasts, product launches, corporate events, etc.).

As described below in more detail with reference to FIGS. 1-46, the online event is provided by a system that establishes an audio conference between one or more speakers and a target audience. The target audience (referred to as "viewers") may experience the audio conference in a listen-only mode ("listen-only viewers"). The system providing the audio conference (a "conferencing" or "conference" system) also presents various role-specific conference user interfaces to the participants during the online event. A viewer user interface comprises the main user interface for presenting the audio conference and the online event to the viewers. A speaker user interface may be presented to the speakers, which may mirror the viewer user interface in terms of content but with optional functionality or alternative content not presented to the viewers. An event production user interface comprises a specially-configured user interface for enabling an event producer to selectively control various aspects of the viewer user interface and/or the speaker user interface. It should be appreciated that the control mechanisms generally comprise tools for enabling the event producer to customize or configure—during the online event—the manner in which the viewers and the speakers experience the online event. In exemplary embodiments, the event production user interface may be configured to enable the event producer to, for example, specify an active speaker to be displayed in the viewer user interface, select one or more presentation schemes or views for the viewer user interface, select and introduce media (e.g., audio, video, documents, presentations, graphics, etc.) for presentation in the viewer user interface, moderate public and/or private chats between the viewers and/or the speakers, or view questions submitted by the viewers and select which ones to present in the viewer user interface.

The conferencing system and the conference user interfaces may be generally configured in the manner described in the above-referenced parent application. The conference user interfaces may be configured to provide any desirable content and/or functionality and may support various user interface and/or conferencing features.

Figure 1:
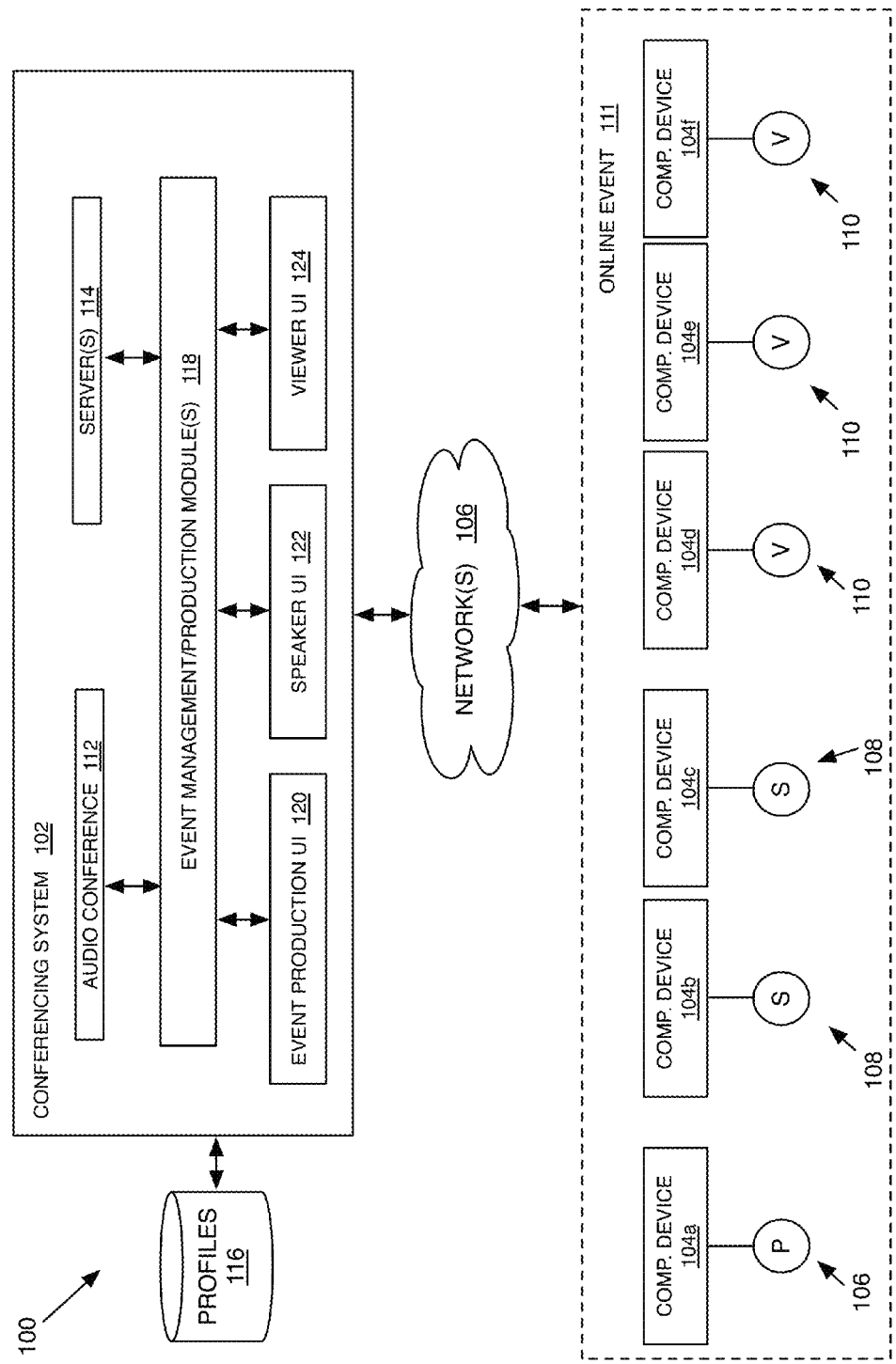
FIG. 1 is a block diagram illustrating an embodiment of a computer system for managing and/or producing an online event comprising one or more speakers and a plurality of viewers.

FIG. 1 illustrates an embodiment of a computer system 100 for providing an online event 111 that may be managed and/or produced by an event producer. The computer system 100 comprises a conferencing system 102 and a plurality of computing devices 104 connected via one or more communication networks 106. The network(s) 106 may support wired and/or wireless communication via any suitable protocols, including, for example, the Internet, the Public Switched Telephone Network (PSTN), cellular or mobile network(s), local area network(s), wide area network(s), or any other suitable communication infrastructure. The computing devices 104 may be associated with corresponding participants (an event producer 106, one or more presenters or speakers 108, and viewers 110) in an online event 111 (including an audio conference 112).

The computing devices 104 may comprise any desirable computing device, which is configured to communicate with the conferencing system 102 and an associated server(s) 114 via the networks 106. The computer device 104 may comprise, for example, a personal computer, a desktop computer, a laptop computer, a mobile computing device, a portable computing device, a smart phone, a cellular telephone, a landline telephone, a soft phone, a web-enabled electronic book reader, a tablet computer, or any other computing device capable of communicating with the conferencing system 102 and/or the server(s) 114 via one or more networks 106. The computing device 104 may include client software (e.g., a browser, plug-in, or other functionality) configured to facilitate communication with the conferencing system 102 and the server 114. It should be appreciated that the hardware, software, and any other performance specifications of the computing device 104 are not critical and may be configured according to the particular context in which the device is to be used.

Figure 3:
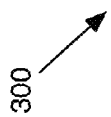
FIG. 3 is a data diagram illustrating an embodiment of a data structure for defining, managing, and controlling the participant roles in the online event.

In the embodiment of FIG. 1, the conferencing system 102 generally comprises a communication system for establishing an online event 111 and/or the audio conference 112 between the computing devices 104. The conferencing system 102 may support audio via a voice network and/or a data network. In one of a number of possible embodiments, the conferencing system 102 may be configured to support, among other platforms, a Voice Over Internet Protocol (VoIP) conferencing platform such as described in U.S. patent application Ser. No. 11/637,291 entitled "VoIP Conferencing," filed on Dec. 12, 2006, which is hereby incorporated by reference in its entirety. It should be appreciated that the conferencing system 102 may support various alternative platforms, technologies, protocols, standards, features, etc. Regardless of the communication infrastructure, the conferencing system 102 may be configured to establish an audio connection with the computing devices 104, although in some embodiments the audio portion may be removed. As illustrated in FIG. 3, the conferencing system 102 and/or servers 114 may establish the audio conference 112 by combining audio streams 306a-306f associated with computing devices 104a-104f. Each computing device 104 may be logically associated with a unique participant ID 302 stored in a profiles database 116. The role of the participants may be defined with a role status 304 indicating whether the participant is a speaker 108, a viewer 110, or the event producer 106.

Figure 2:
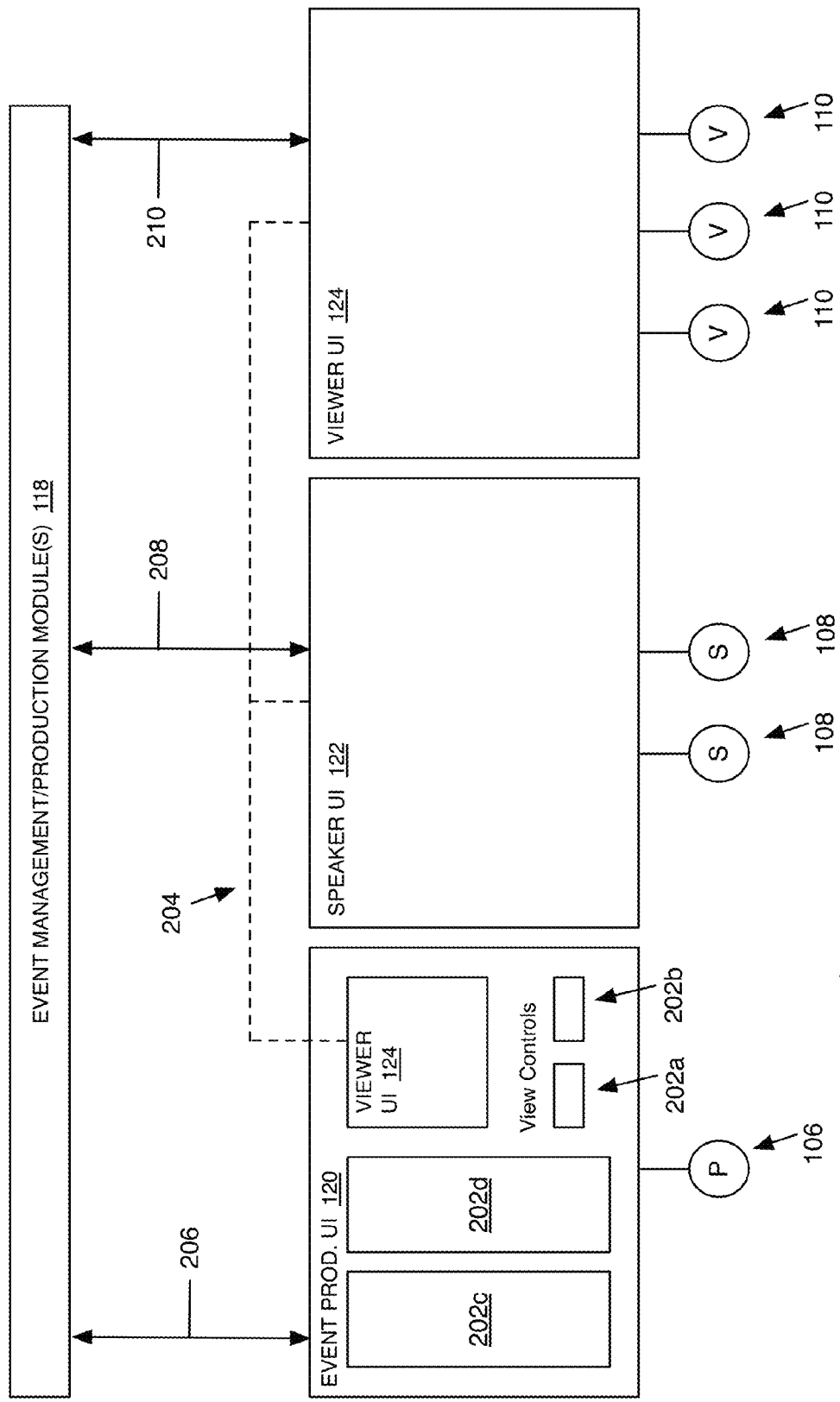
FIG. 2 is a combined functional/block diagram illustrating the general architecture, operation, and/or functionality of an embodiment of the event management/production module(s) of FIG. 1.

Referring again to FIG. 1, conferencing system 102 may comprise event management/production module(s) 118 configured to present an event production user interface 120, a speaker user interface 122, and a viewer user interface 124. As illustrated in FIG. 2, during the online event, the event production user interface 120 is presented to the event producer 106, the speaker user interface 122 is presented to the speakers 108, and the viewer user interface is presented to the viewers 110. Each of the user interfaces 120, 122, and 124 may be presented via a client application (e.g., a browser, one or more browser plug-ins, and/or a special-purpose client). It should be appreciated that the user interfaces 120, 122, and 124 may include logic located and/or executed at the computing devices 104, the conferencing system 102, server(s) 114, or any combination thereof, and may be presented to and displayed via a graphical user interface and an associated display (e.g., touchscreen display device or other display device).

The event management/production modules 118 (and any other associated control and presentation modules) may be embodied in memory and executed by one or more processors. It should be appreciated that any aspects of the event management/production modules 118 may be stored and/or executed by the computing devices 104, the conferencing system 102, the servers 114, or other related server(s) or web services.

Referring to FIG. 2, the event management/production module(s) 118 enable the conferencing system 102 to separately configure, manage, and control the user interfaces 120, 122, and 124, as well as provide the audio conference 112 and any other content and/or functionality to the computing devices 104. Communications with the event producer 106 may be controlled via a communication channel 206 that presents the event production user interface 120. Communications with the speakers 108 may be controlled via a communication channel 208 that presents the speaker user interface 122. Communications with the viewers 110 may be controlled via a communication channel 210.

As mentioned above, the event production user interface 120 generally comprises various tools for enabling the event producer 106 to selectively control various aspects of the viewer user interface 124 and/or the speaker user interface 122 during the online event 111. The event production user interface 120 may comprise one or more user interface components (202) for implementing various control features. In the exemplary embodiment of FIG. 2, the viewer user interface 124 and/or the speaker user interface 122 may be simultaneously displayed in the event producer user interface 120 (reference line 204) to enable the event producer 106 to see what is being displayed to the speakers 108 and/or the viewers 110 during the online event 111. It should be appreciated that the control mechanisms 202 generally comprise production tools for enabling the event producer 106 to customize the content and/or functionality presented in the speaker user interface 122 and/or the viewer user interface 124.

Figure 4:
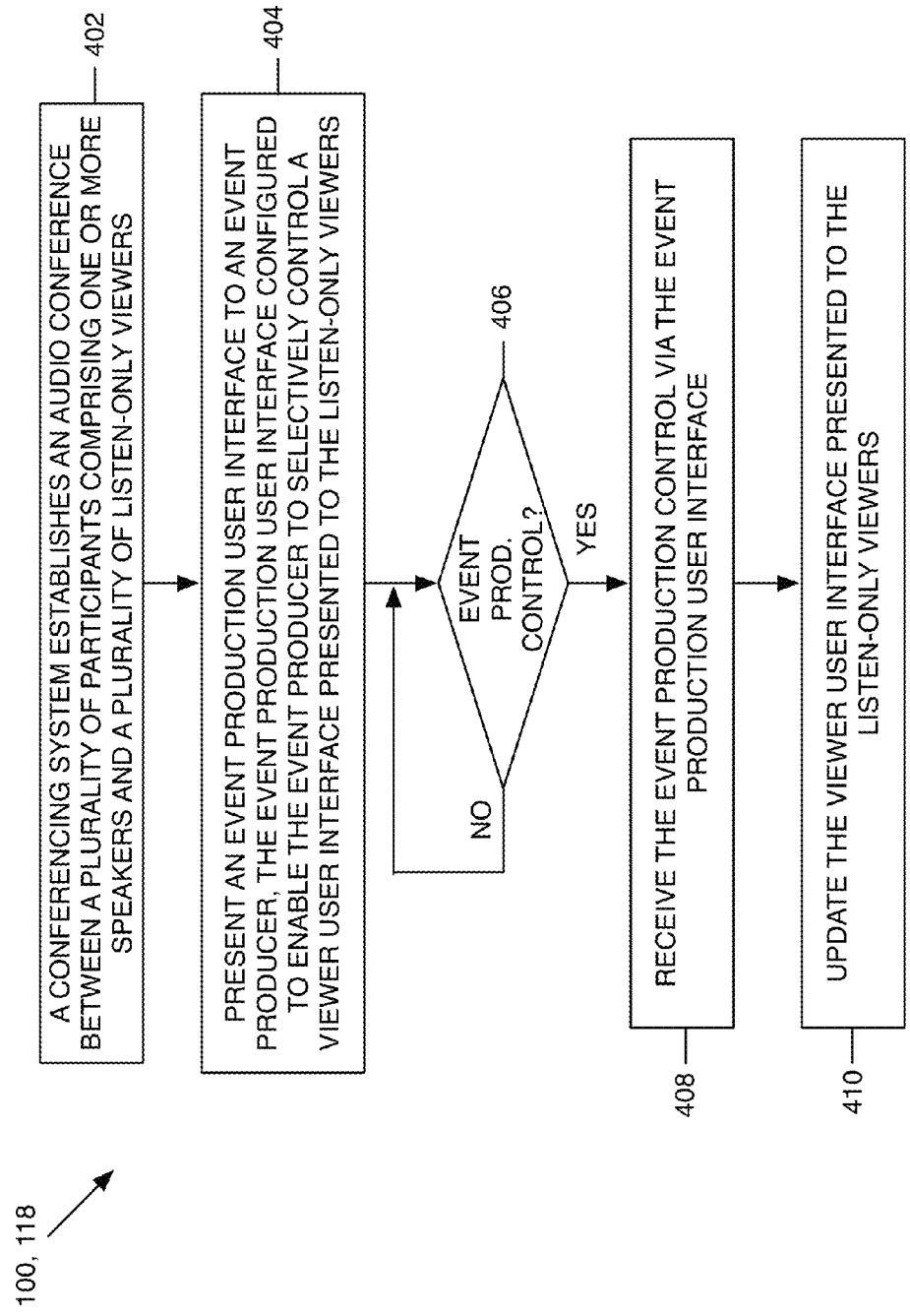
FIG. 4 is a flowchart illustrating the architecture, operation, and/or functionality of an embodiment of the event management/production module(s) of FIG. 1.

FIG. 4 is a flowchart illustrating the general architecture, operation, and/or functionality of an embodiment of the event management/production modules 118. At block 402, the conferencing system 102 establishes an audio conference 112 between one or more speakers 108, the event producer 106, and a plurality of viewers 110 accessing the conferencing system 102 via computing devices 104 connected to network(s) 106. Although not required, the viewers 110 may be added to the audio conference 112 in a listen-only mode so that they are only able to listen to the audio, while the speakers 108 are able to listen and speak. Depending on the particular purpose and context for the event, the online event 111 may host any number of event producers 106, speakers 108, and viewers 110. It should be appreciated, however, that the event production and management tools may be particularly advantageous for controlled situations in which the event is organized by a content provider and directed to a large audience of viewers 110 (e.g., hundreds or even thousands or more viewers).

At block 404, the conferencing system 102 and/or servers 114 present the event production user interface 120 to the event producer 106. As described below in more detail, the event production user interface 120 may comprise various components 202 for enabling the event producer 106 to selectively control the content and/or functionality presented in the viewer user interface 124 and speaker user interface 122. If the event producer 106 desires to produce content or configure certain functionality or applications, the applicable event production/management controls (components 202) are selected via the event production user interface 120 (decision block 406). At block 408, the event management/production modules 118 receive an event production control command initiated by the event production user interface 120. In response to the command, the event production/management modules 118 determine the particular control being requested and then update the viewer user interface 124 and/or the speaker user interface 122 with the associated content and/or functionality.

Figure 5:
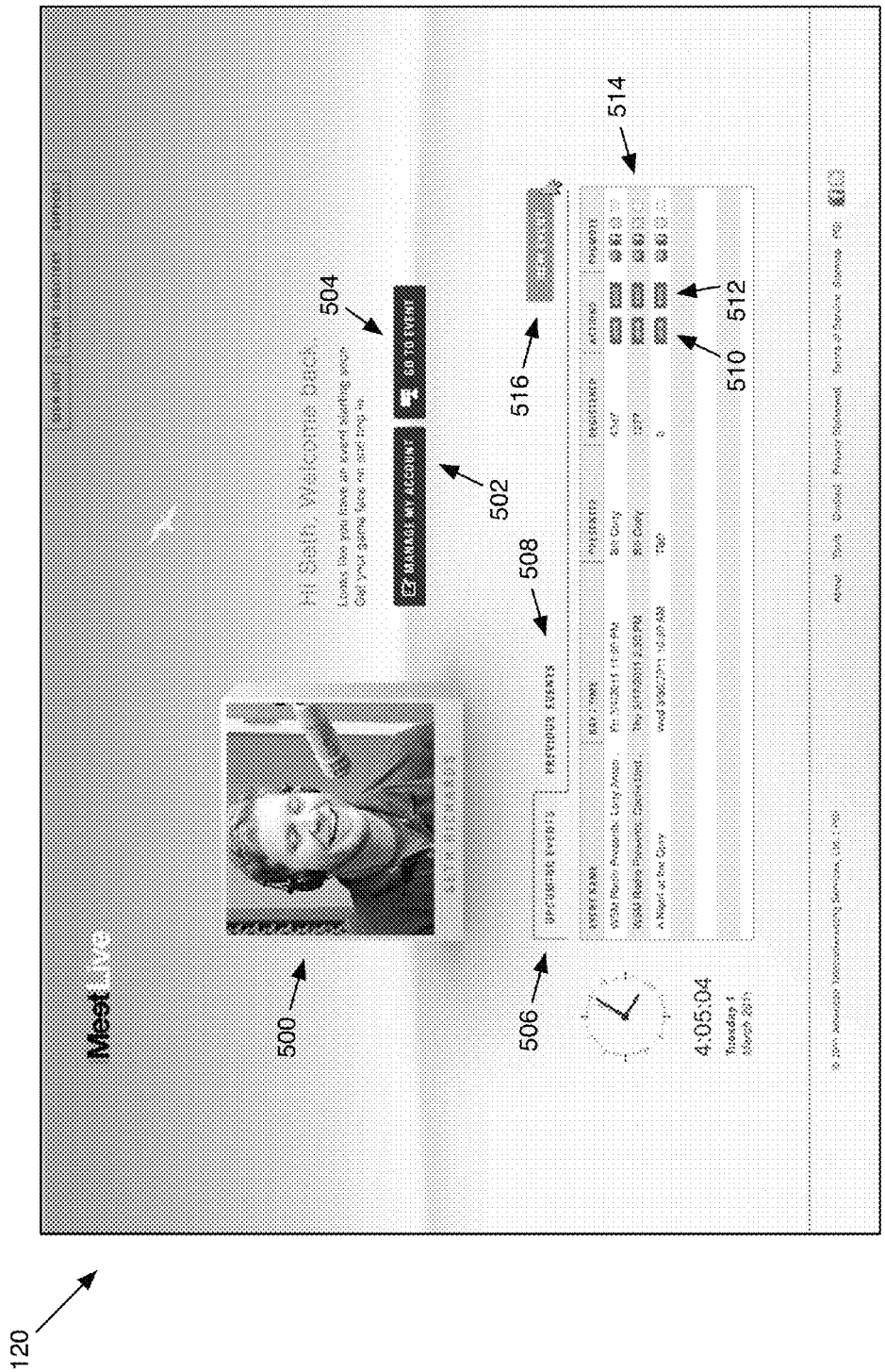
FIG. 5 is a user interface screen shot illustrating an embodiment of the event production user interface of FIGS. 1 & 2 for displaying an events dashboard.

It should be appreciated that the event production/management controls may be initiated, scheduled, or performed at any applicable time before the online event 111 or during the online event 111. FIG. 5 illustrates an embodiment of the event production user interface 120 for managing upcoming events (tab 506) or previous events (tab 508), scheduling new events (component 516), starting an event (component 504), or managing an event production account (component 502). The event production account may be associated with a content provider or a third party that manages online events 110 for the content provider. FIG. 5 illustrates a list of upcoming scheduled events by event name, day/time and presenter, and may indicate the number of current viewers registered for the online event 111. The event producer 106 may join an online event 111 already scheduled by selecting an item from the list view (join button 510). Existing online events 110 may also be edited via edit button 512 or promoted via associated social networking or other web-based communication or marketing tools (buttons 514).

As described in the above-referenced parent patent application, the various user interfaces may be configured to visually identify one or more participants with unique participant objects 500 for identifying the participants. In FIG. 5, a participant object 500 is displayed identifying the event producer 106. In an embodiment, a participant object 500 (displayed in any of the user interfaces 120, 122, and 124) may comprise a graphical representation, profile information, an audio indicator, and a business card component. The graphical representation may comprise a picture, photograph, icon, avatar, etc. for identifying the corresponding participant. The graphical representation may comprise an image that is uploaded to the server 114, imported from a social networking profile, or selected and/or customized from predefined images. The graphical representation may also comprise a default image if one has not been defined by a participant.

The profile information may comprise information provided by the participant and stored in user profiles database 116 (FIG. 1). The audio indicator visually identifies when the associated participant is speaking during the audio conference 112 by monitoring the audio streams 306. The audio stream 306 may be logically associated with the corresponding audio indicator according to a participant identifier 302. During the audio conference 112 when a participant is speaking, the audio indicator may be displayed in a first visual state, such as, by graying out the audio indicator. When the participant is speaking, the audio indicator may be displayed in a second visual state, such as, by blacking out the audio indicator. It should be appreciated that any visual and/or audio distinctions may be employed to identify a speaking participant in any of the user interfaces 120, 122, and 124.

The participant objects 500 may include a user interface component for launching a business card component that, when selected, displays further information about the participant. The business card component may trigger the display of any additional participant profile or identification information. When the component is selected, the participant object 500 "flips" to the business card component, which displays additional parameters (e.g., name, title, organization, location, contact information, interests, or other biographical information). The business card component may further comprise a participant profile control, which comprises a user interface control for enabling the participants to edit their own, or another participant's, information during the online event 111. An "exit" button may be selected to "flip" the object to a default display.

In another embodiment, the interactive participant object 500 may be customized by a participant. The participant object 500 may be configured as an interactive shape (e.g., a cube) with a plurality of user-selectable display portions (e.g., two or more cube faces. The cube faces may be customized to display various types of information, including, a personal greeting, a menu listing available social networking accounts associated with the participant. As described in the above-referenced patent application, the conferencing system 102 may be configured to communicate with social networking systems via an API. During the online event 111, other participants may interact with displayed participant objects 500 and, for example, view the participant's social networking profile displayed in one of the cube faces. One or more links may also be displayed for viewing the participant's full profile, as well as sending a request to join the participant's social network. In another embodiment, a participant may also customize various aspects of the participant objects 500 during the online event 111. The participants may also resize a particular participant object 500, rearrange displayed participant objects 500, or customize their own participant object 500 directly from the participant object 500.

Figure 6:
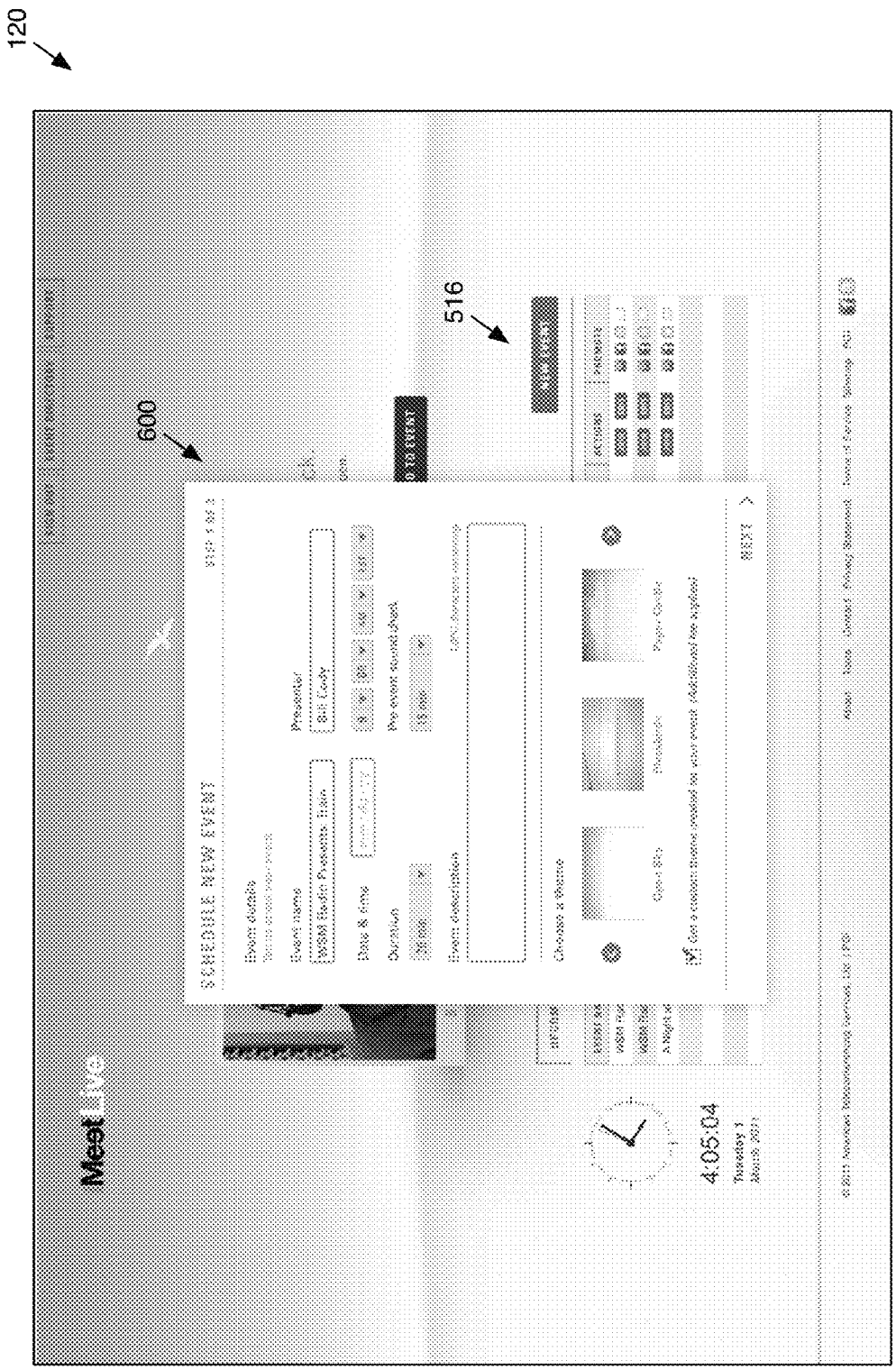
FIG. 6 illustrates a first configuration step for scheduling a new online event via the event production user interface of FIG. 5.
Figure 7:
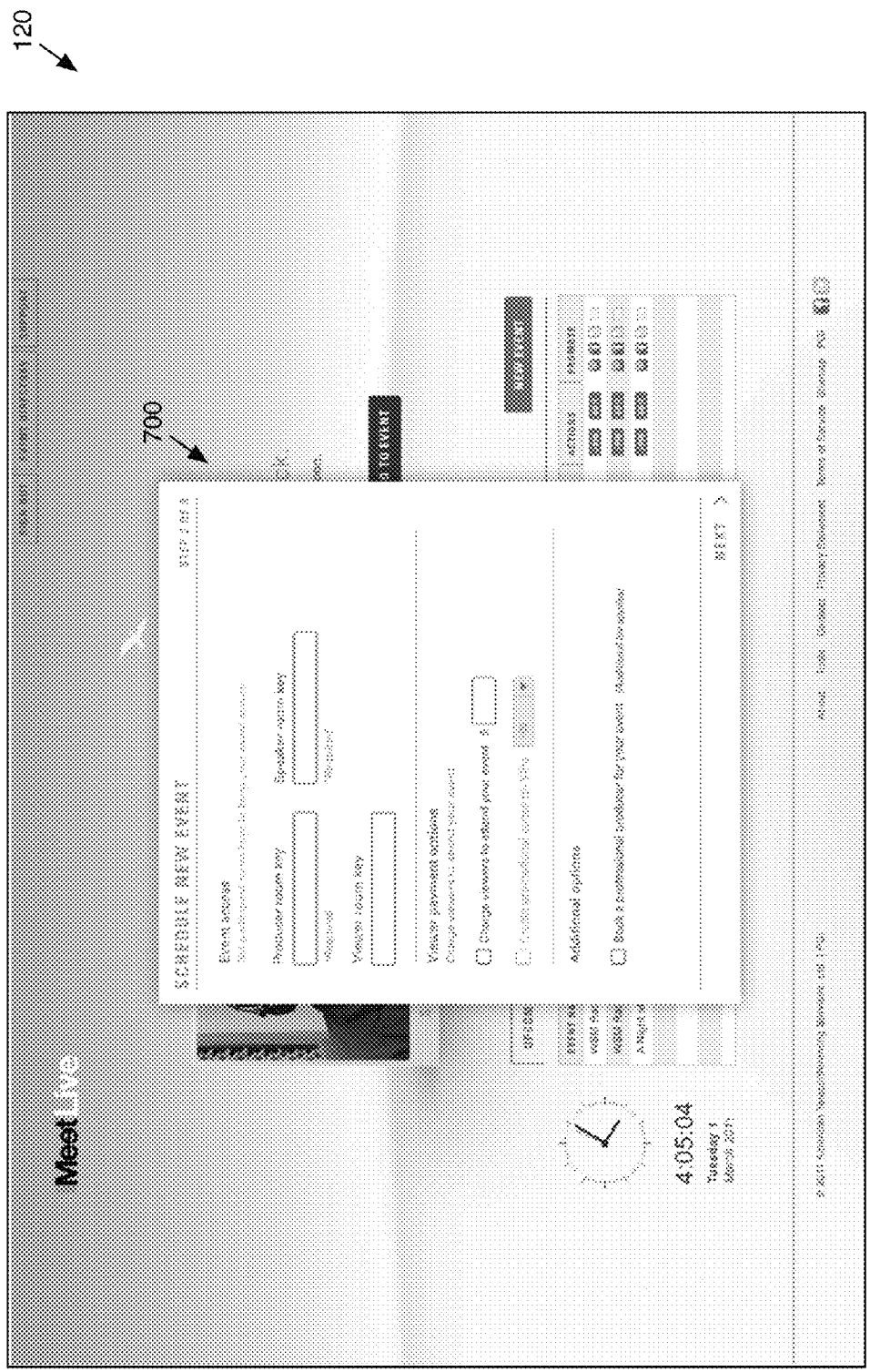
FIG. 7 illustrates a second configuration step for scheduling a new online event via the event production user interface of FIG. 5.
Figure 8:
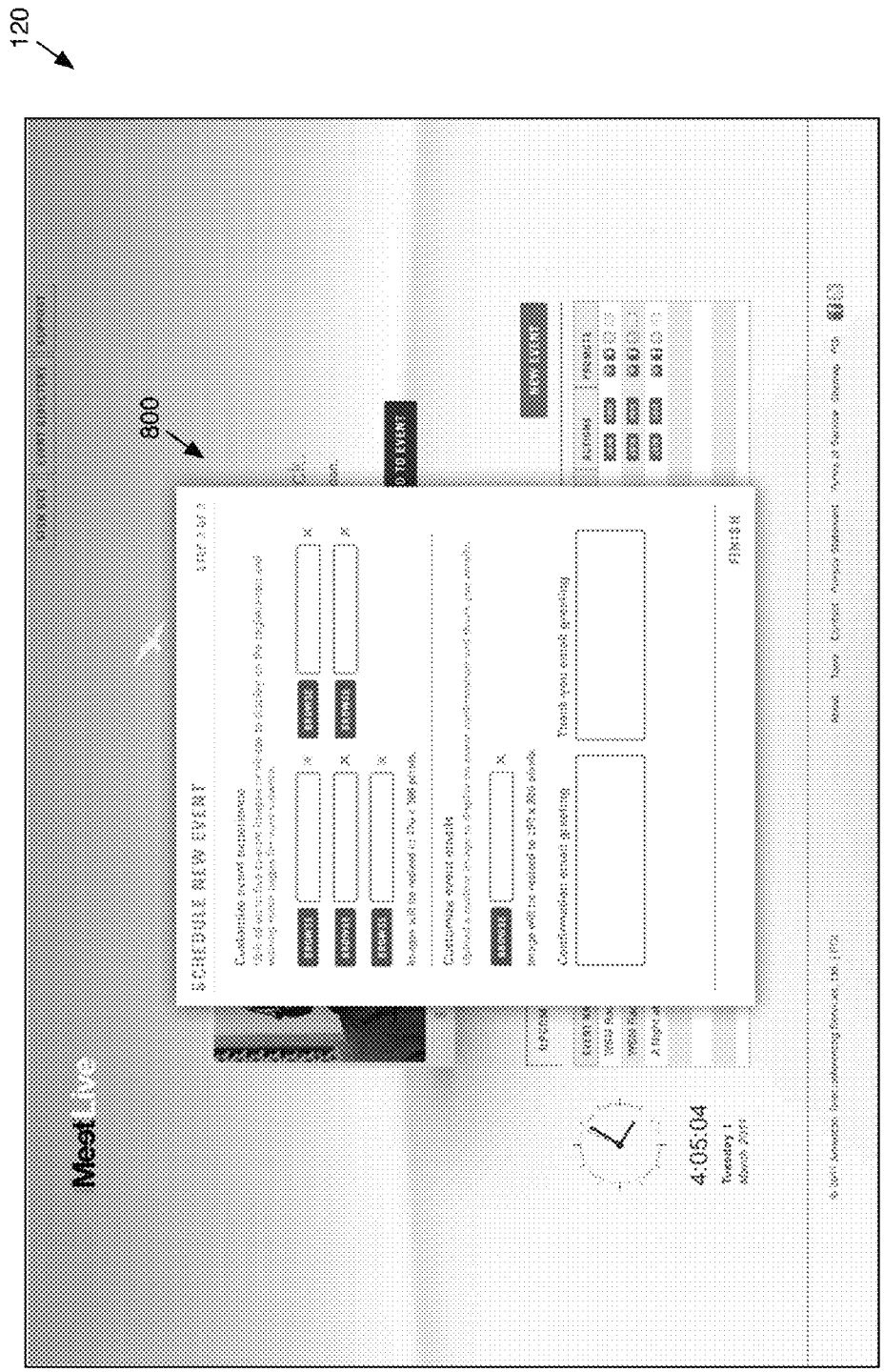
FIG. 8 illustrates a third configuration step for scheduling a new online event via the event production user interface of FIG. 5.

FIGS. 6-8 illustrate a series of exemplary screen shots for scheduling a new online event 111 via the event production user interface 120 (button 516). In this embodiment, the event producer 106 is taken through three steps for configuring various aspects of the online event. In step 1 (FIG. 6), the event producer is prompted to enter or configure parameters, such as, the event details, event description, event name, presenter, date/time, duration, pre-event soundcheck (a set time prior to beginning the online event 111), and a theme for the viewer user interface 124 or speaker user interface 122.

In step 2 (FIG. 7), the event producer 106 may configure security/access permissions for the online event 111 by specifying role-specific keys or passwords for the event producer 106, speakers 108, and viewers 110. The content provider may also control whether the online event 111 will be a free event, specify a charge to attend, or issue promotional codes. The content provider may also choose to hire a third party production company to manage and produce the online event 111. In step 3 (FIG. 8), the event producer 106 may customize the event experience by uploading, for example, custom images, videos, graphics, or other media to configure the viewer user interface 124 during or before the online event or, alternatively, to configure confirmation emails or other messages presented to registered viewers.

Figure 9:
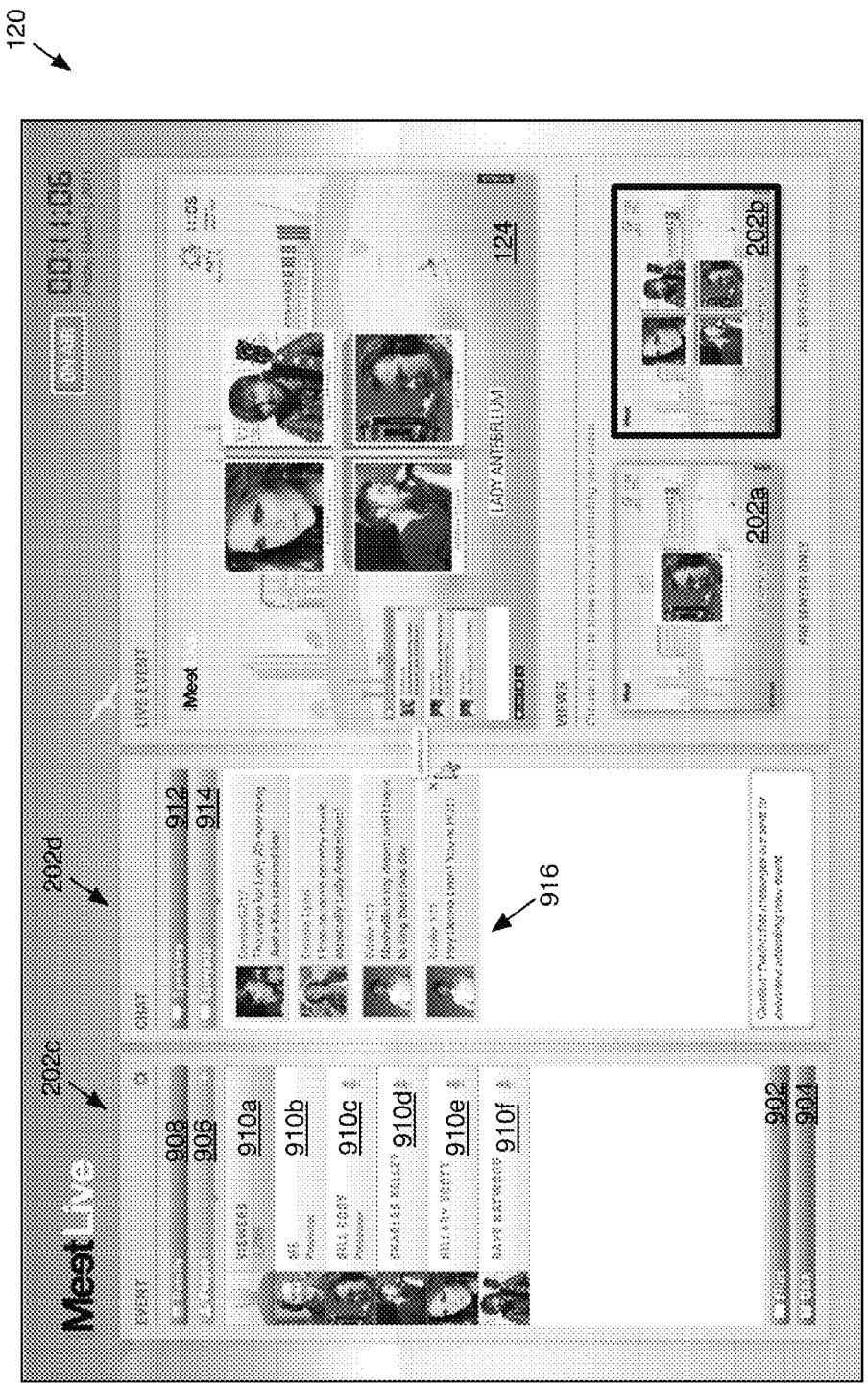
FIG. 9 is a user interface screen shot illustrating another embodiment of an event production user interface for enabling an event producer to selectively control views associated with the viewer user interface.
Figure 10:
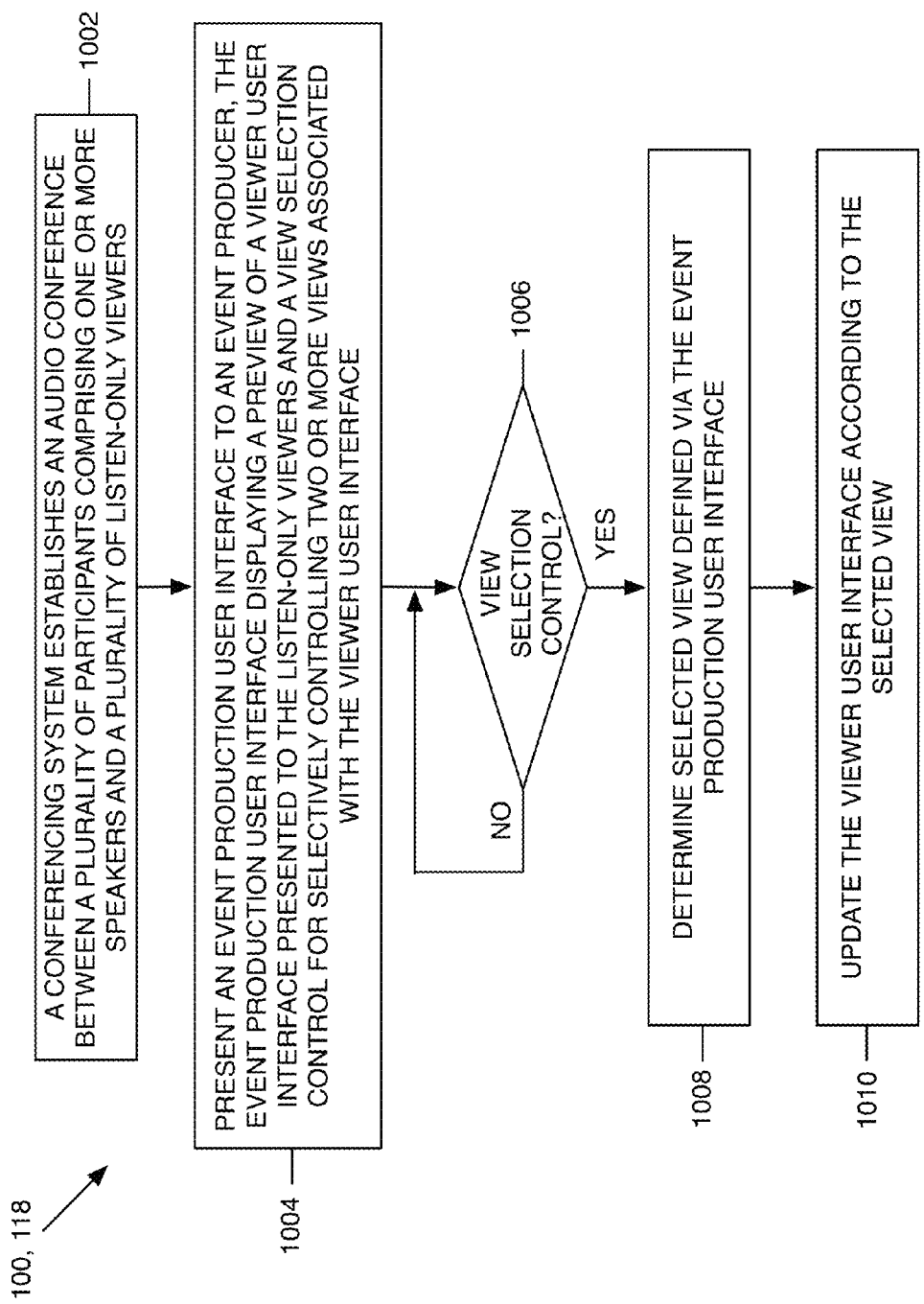
FIG. 10 is a flowchart illustrating an embodiment of the event management/production module(s) of FIGS. 1 & 2 for selectively controlling views associated with the viewer user interface via the event production user interface.
Figure 11:
FIG. 11 is a user interface screen shot illustrating an embodiment of the viewer user interface in which the event producer has selected an "all speakers" view.

FIGS. 9-11 illustrate an embodiment of a view selection control implemented via the event production user interface 120. In general, the view selection control enables the event producer 106 to selectively control, during the online event 111, which of a plurality of predetermined views are to be displayed to the viewers 110 in the viewer user interface 124. Referring to FIG. 9, the event production user interface 120 may simultaneously display the viewer user interface 124 and the various control components 202. An event control component 202c may comprise an interactive control panel for selectively accessing details about the online event (details bar 908) and interacting with a list of participants (people bar 906). When selected, the people bar 906 may display list items 910 identifying the participants by name and role (i.e., speaker, viewer, or event producer) with an optional avatar, icon, photograph, or other visual graphics. Where a large number of viewers 110 are participant, they may be grouped into a single item 910 with an indication of the number of current viewers. As described below in more detail, the event control component 202c may further comprise a file or media sharing bar 902 and a Q&A bar 904. The file sharing bar 902 enables the event producer 106 to produce content in the viewer user interface 124 during the online event 111, and the Q&A bar 904 enables the event producer 106 to manage questions submitted by the viewers 110.

A chat control component 202d may comprise a further interactive panel for controlling, managing, and moderating online chats or other messaging applications between the speakers 108 and/or the viewers 110. A speakers bar 912 exposes messages 916 exchanged during a speaker chat, and the everyone bar 914 exposes messages 916 submitted by the viewers 110.

View selection controls 202a and 202b provide a convenient production tool for enabling the event producer to selectively change predefined views associated with the viewer user interface 124. The views may customize any desirable presentation parameters. In the embodiment illustrated in FIG. 9, the view selection control 202a enables the event producer 106 to configure the viewer user interface 124 to display only the current speaker 108 in the online event 111. The view selection control 202b enables the event producer 106 to display all speakers 108. Regardless the view, the displayed speakers 108 may be visually identified with corresponding participant objects 500, as described above.

In operation, the event producer 106 may select either of the view selection controls 202a and 202b. The event management/production modules 118 determine which view is selected in the event production user interface 120 and presents the corresponding view in the viewer user interface 124. FIG. 9 shows that the view selection control 202b has been selected. FIG. 11 illustrates the resulting view presented in the viewer user interface 124, in which all four speakers 108 are identified with a corresponding participant object 1104a, 1104b, 1104c, and 1104d. As further illustrated in FIG. 11, the viewer user interface 124 may also display other information about the online event 111 (e.g., an event title 1102), current date/time, and other information customized to the particular viewer 110 (e.g., local weather, news, etc.). As described below in more detail, the viewer user interface 124 may also present user interface components for accessing various conferencing features, such as, for example, a viewer chat (chat component 1106), a question submission component 1110 for submitting questions to the event producer 106, and a social networking component 1112 for interacting with a social networking feed associated with the online event 111.s FIG. 10 illustrates the architecture, operation, and/or functionality of an embodiment of the event management/production modules 118 for implementing the view selection control. At block 1002, the conferencing system 102 establishes an audio conference 112 between one or more speakers 108, the event producer 106, and a plurality of viewers 110 accessing the conferencing system 102 via computing devices 104 connected to network(s) 106. At block 1004, the conferencing system 102 and/or servers 114 present the event production user interface 120 to the event producer 106. The event production user interface 120 may simultaneously display the viewer user interface 124 and the view selection control components 202a and 202b (FIGS. 2 & 9). At decision block 1006, the event management/production modules 118 determine whether the current view is to be changed to a new view. If the event producer 106 initiates a change to a new view or otherwise changes presentation parameters associated with the viewer user interface 124, the event management/production modules 118 determine the selected new view or presentation parameters (block 1008) and updates the viewer user interface 124 accordingly (block 1010).

Figure 12:
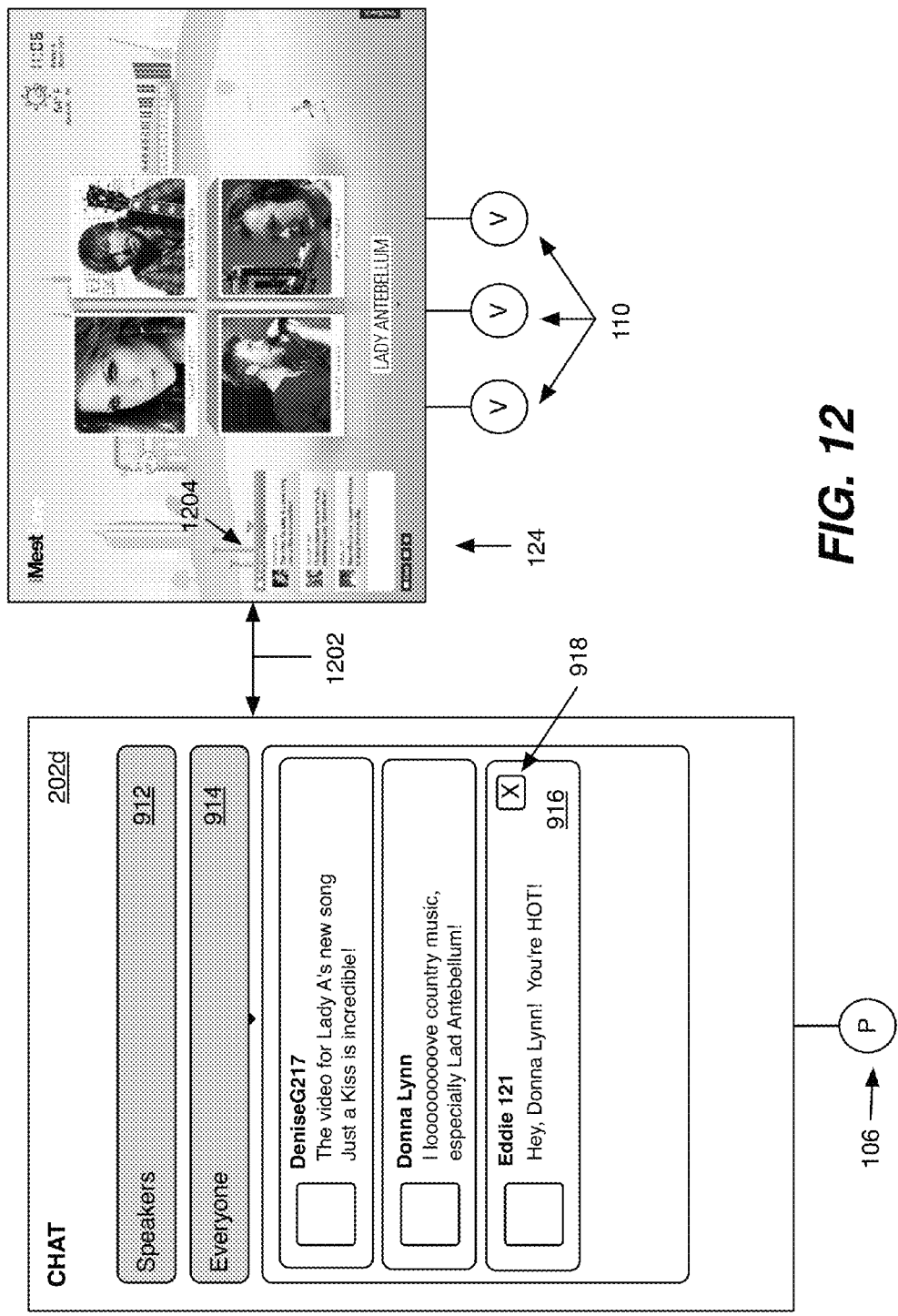
FIG. 12 illustrates an embodiment of a chat moderation control implemented via the event production user interface.
Figure 20:
FIG. 20 is a user screen shot illustrating an embodiment of a speaker user interface provided to speakers participating in the online event.

FIGS. 12 & 20 illustrate a more detailed view of the chat control component 202d and the operation of the associated features for moderating a viewer or speaker chat. FIG. 12 illustrates a viewer chat panel 1204 that may be launched from the chat component 1106. The viewer chat panel 1204 enables viewers 110 to interact with each other by submitting text or other messages via the conferencing system 102 or other systems, such as, a social networking computer system. FIG. 20 illustrates an embodiment of a speaker user interface 122 for enabling speakers 108 to exchanges messages either with each other, the viewers 110, or any combination thereof. The speaker user interface 122 may include a speaker chat panel 2002 (FIG. 20), which may be selectively displayed via a chat button 1106. The speaker chat panel 2002 may separately display a speaker chat application (speaker bar 2004) and a public chat application (everyone bar 2003). Referring again to FIG. 12, the event production user interface 120 may maintain a communication channel 1202 for receiving and displaying the messages 916 submitted by the speakers 108 (speakers bar 912) and the viewers 110 (everyone bar 914). The event producer 106 may moderate either chat by, for example, deleting inappropriate messages 916 via, for example, a delete button 918.

Figure 13:
FIG. 13 is a user interface screen shot illustrating an embodiment of the event production user interface for enabling the event producer to selectively define and share media files to be presented to the viewer user interface during the online event.
Figure 14:
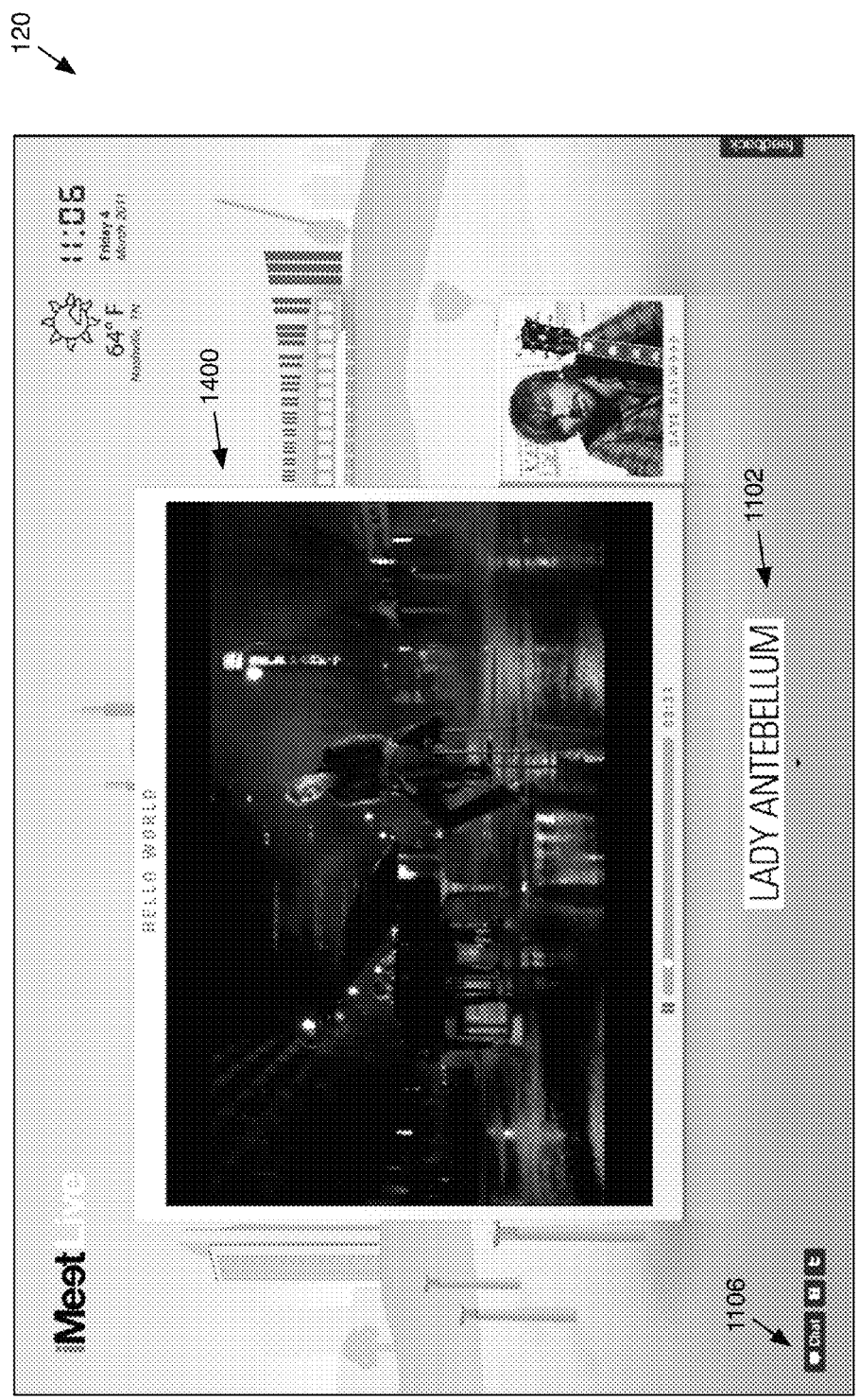
FIG. 14 illustrates an embodiment of the viewer user interface after the event producer has shared a media file.
Figure 15:
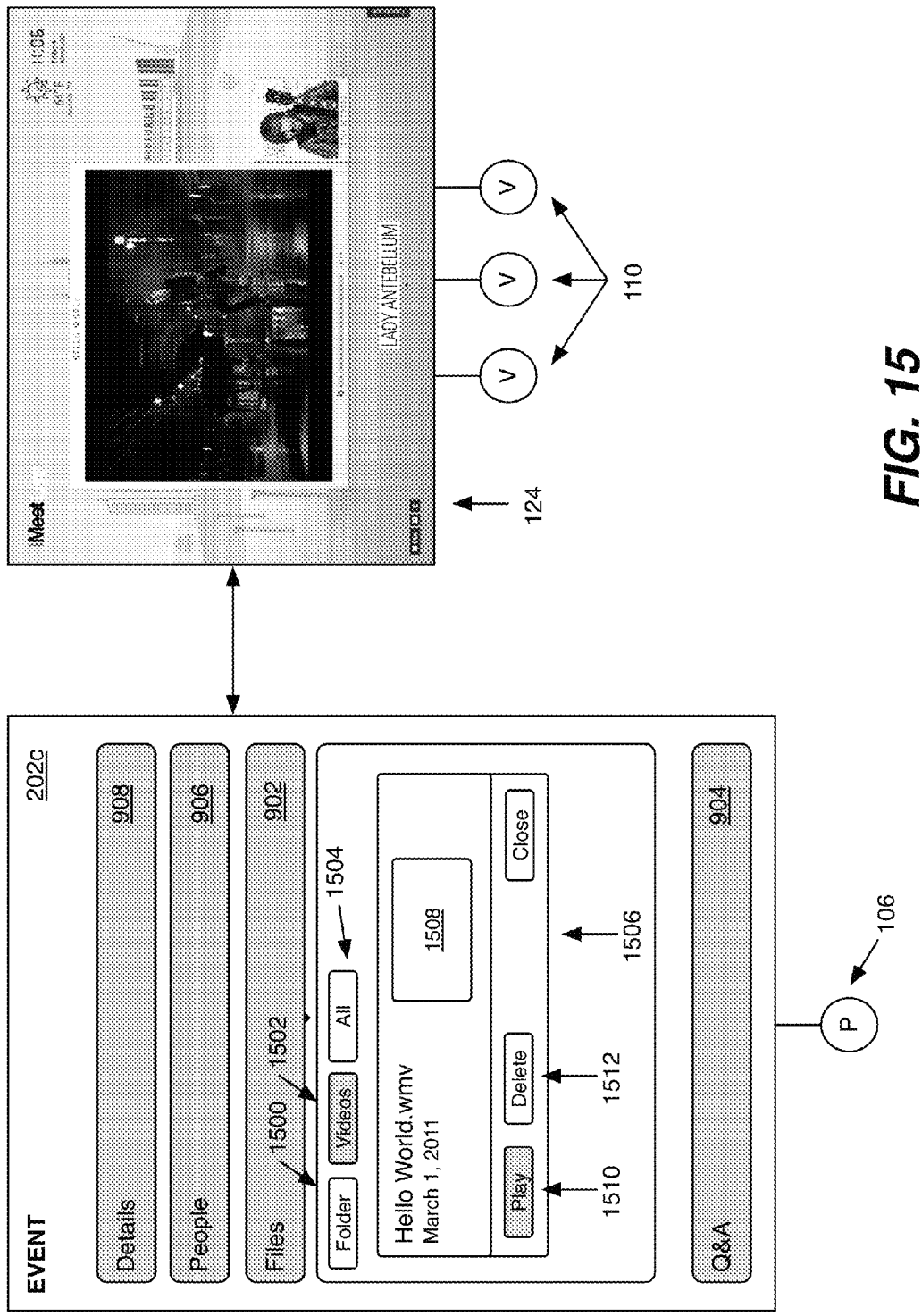
FIG. 15 illustrates an embodiment of the media sharing control provided via the event production user interface.

FIGS. 13-16 illustrate an embodiment of a file or media sharing control implemented via the event production user interface 120. FIGS. 13 & 15 illustrate the file sharing bar 902 expanded to present control functions for enabling the event producer 106 to specify content to be presented in the viewer user interface 124 during the online event 111. As best illustrated in FIG. 15, the event producer 106 may search or browse for media stored in a local or remote folder (folder button 1500) or, alternatively, view all available media files (all button 1504) or according to type (e.g., video button 1502). In FIG. 15, the video button 1502 has been selected to display a media file 1506 available for presentation in the viewer user interface 124. It should be appreciated that the media file 1506 may comprise any type of media, such as, text, graphics, video, or audio in any desirable format (e.g., documents, presentations, videos, images, etc.). The media file 1506 may be displayed with a corresponding thumbnail image 1508 along with a play button 1510 and a delete button 1512. To produce the media to the viewer user interface 124, the event producer 106 may select the play button 1510. In response to selection of the play button 1510, the applicable media file 1506 may be automatically presented to the viewer user interface 124 (FIGS. 14 & 15).

Figure 16:
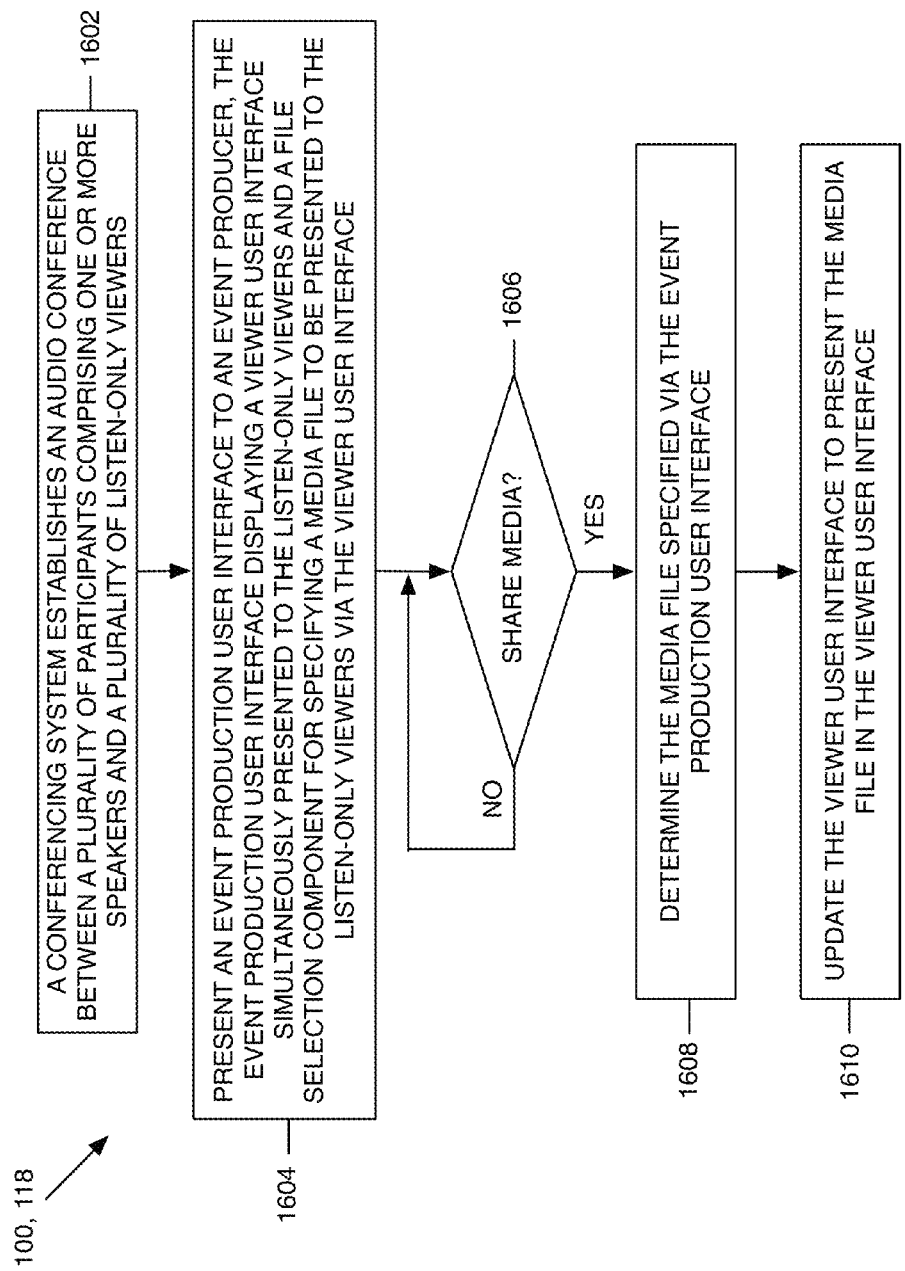
FIG. 16 is a flowchart illustrating an embodiment of the event management/production module(s) of FIGS. 1 & 2 for implementing the media sharing control of FIG. 15.

FIG. 16 illustrates the architecture, operation, and/or functionality of an embodiment of the event management/production modules 118 for implementing the media sharing control. At block 1602, the conferencing system 102 establishes an audio conference 112 between one or more speakers 108, the event producer 106, and a plurality of viewers 110 accessing the conferencing system 102 via computing devices 104 connected to network(s) 106. At block 1604, the conferencing system 102 and/or servers 114 present the event production user interface 120 to the event producer 106 and the viewer user interface 124 and the speaker user interface 122 to the viewers 110 and speakers 108, respectively. The event production user interface 120 may simultaneously display the viewer user interface 124 and a file sharing bar 902. At decision block 1606 and block 1608, the event management/production modules 118 determines the media file 1506 identified by the event producer 106 via the event production user interface 120. At block 1610, in response to the command initiated by the event producer 106, the event management/production modules 118 present the media file 1506 in the viewer user interface 124.

Figure 17:
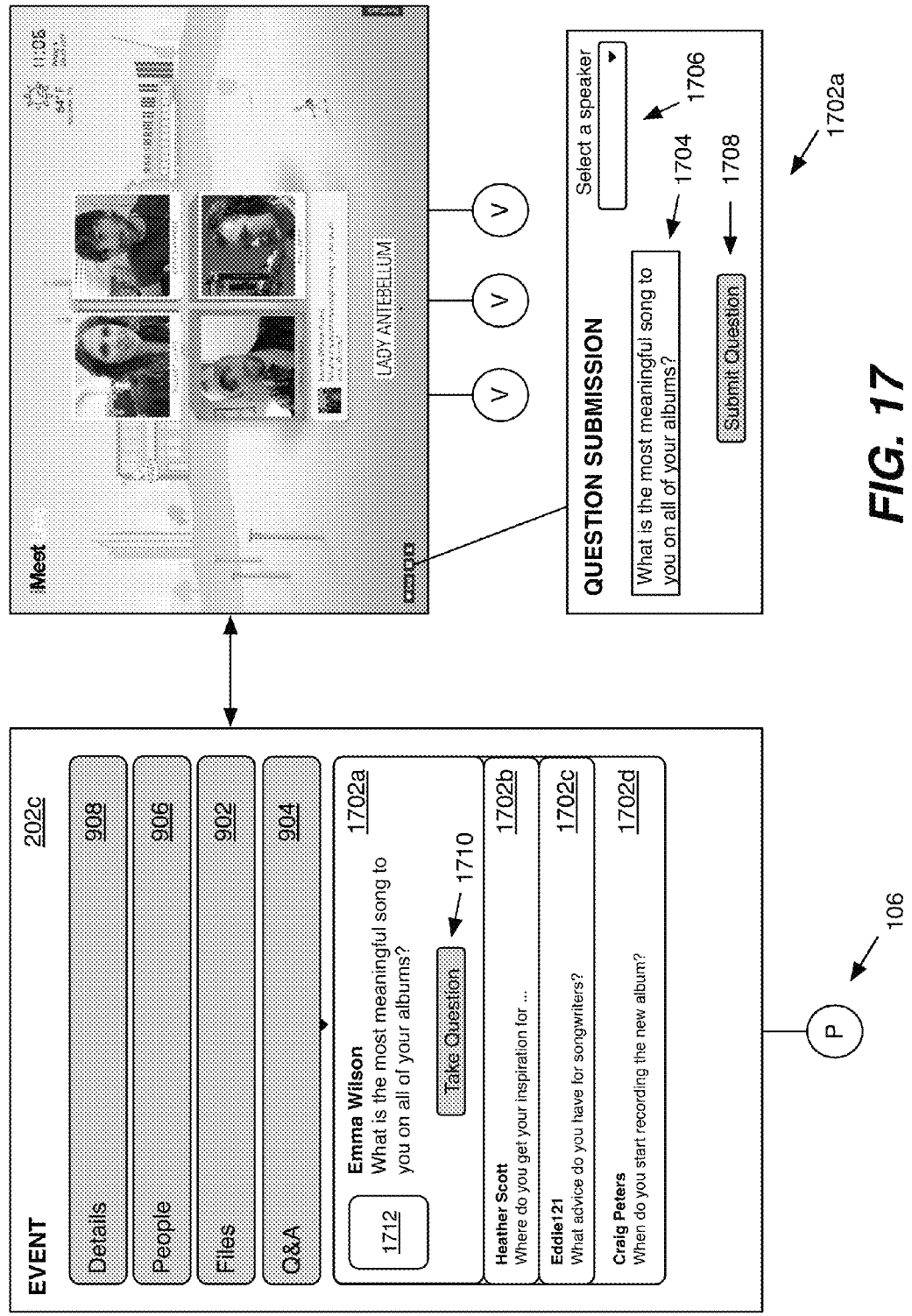
FIG. 17 illustrates an embodiment of a Q&A management control provided via the event production user interface.
Figure 18:
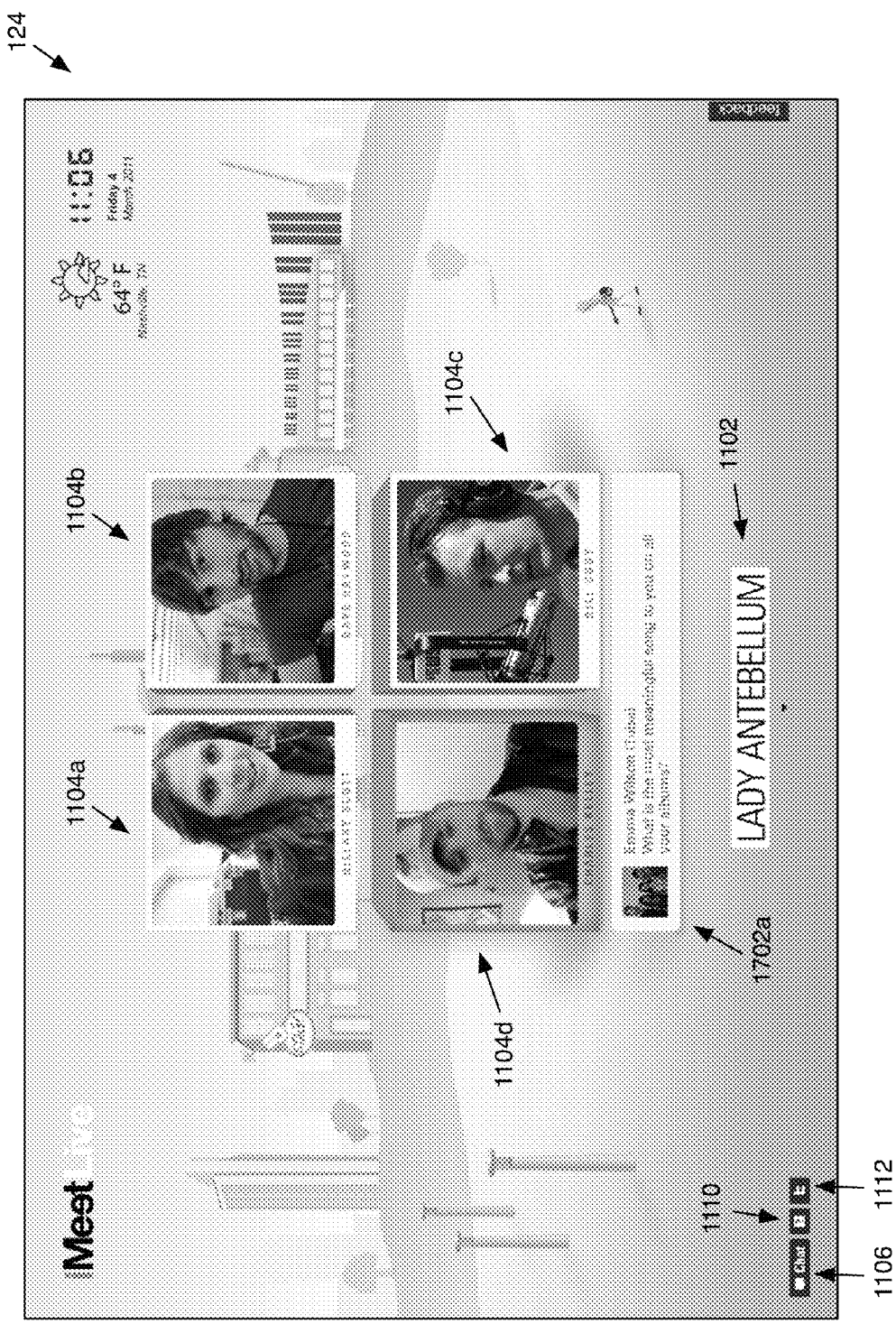
FIG. 18 illustrates an embodiment of the viewer user interface after the event producer has selected a question submitted by one of the viewers.
Figure 19:
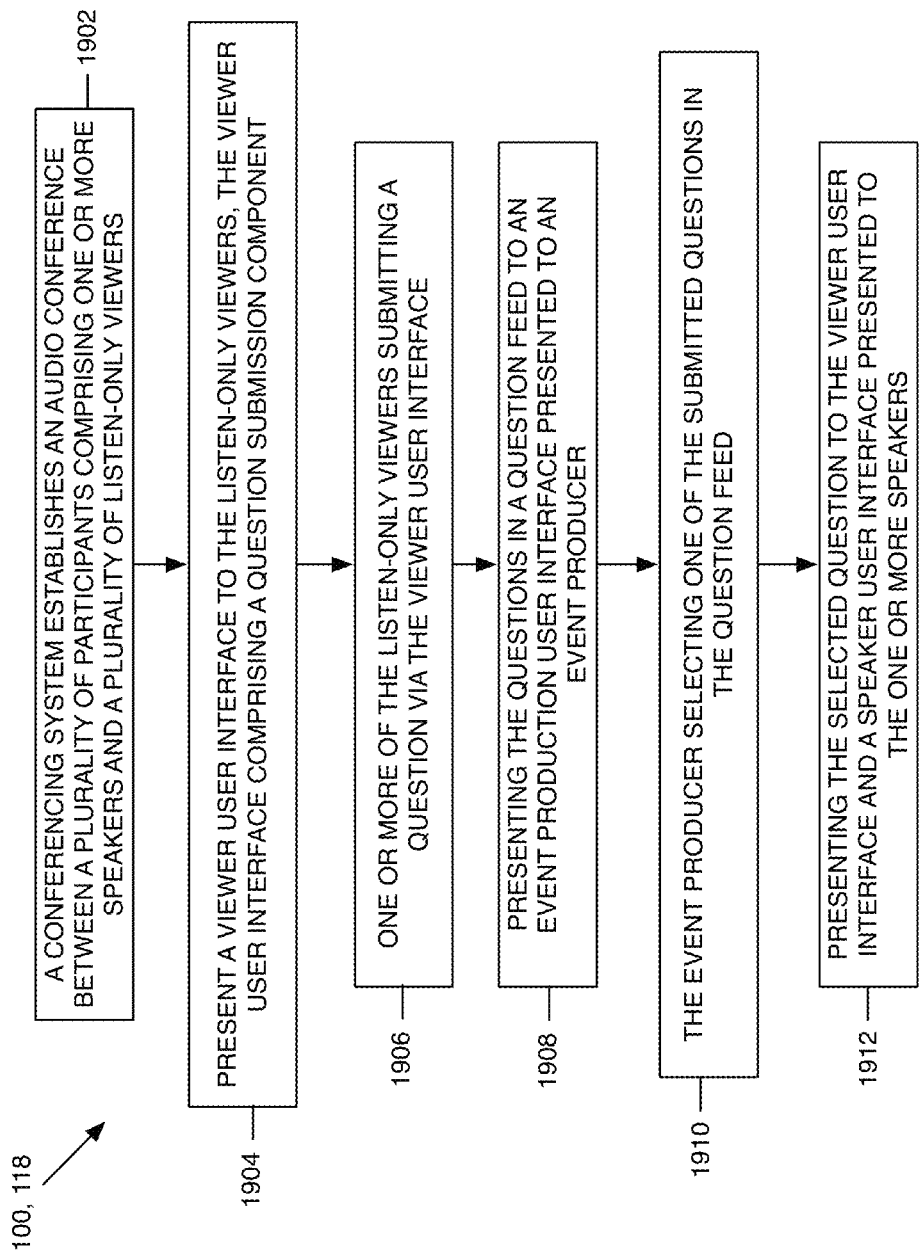
FIG. 19 is a flowchart illustrating an embodiment of the event management/production module(s) of FIGS. 1 & 2 for implementing the Q&A management control of FIG. 17.

FIGS. 17-19 illustrate an embodiment of a question submission/management control implemented via the event production user interface 120 and the viewer user interface 124. In operation, the viewers 110 may launch a question submission panel 1702 by selecting the question submission component 1110. As illustrated in FIG. 17, viewers 110 may insert a question into a text box 1704, select a target speaker 108 for the question (drop-down box 1706), and submit the question to the conferencing system 102 (button 1708). Submitted questions may be displayed in the event production user interface 120 under the Q&A bar 904. The questions may be displayed as a scrollable feed. The event producer 106 may navigate the feed and select a particular question (question 1702a in FIG. 17). When selected, the question may be expanded to display the identity of the viewer (thumbnail 1712), the text of the question, and prompt the event producer 106 to "take the question" (button 1710). If the event producer 106 "takes" the question by selecting button 1710, the question 1702a is then presented in the online event 111 by displaying in the viewer user interface 124.

FIG. 19 illustrates the architecture, operation, and/or functionality of an embodiment of the event management/production modules 118 for implementing the question submission/management control. At block 1902, the conferencing system 102 establishes an audio conference 112 between one or more speakers 108, the event producer 106, and a plurality of viewers 110 accessing the conferencing system 102 via computing devices 104 connected to network(s) 106. At block 1904, the conferencing system 102 and/or servers 114 present the view user interface 124 to the viewers 110. At block 1906, one or more viewers 110 submit questions via the viewer user interface 124. At block 1908, the submitted questions are presented in the event production user interface 120 to the event producer 106. At block 1910, the event producer 106 may browse and select one of the submitted questions for presentation in the viewer user interface 124 (block 1912).

Figure 21:
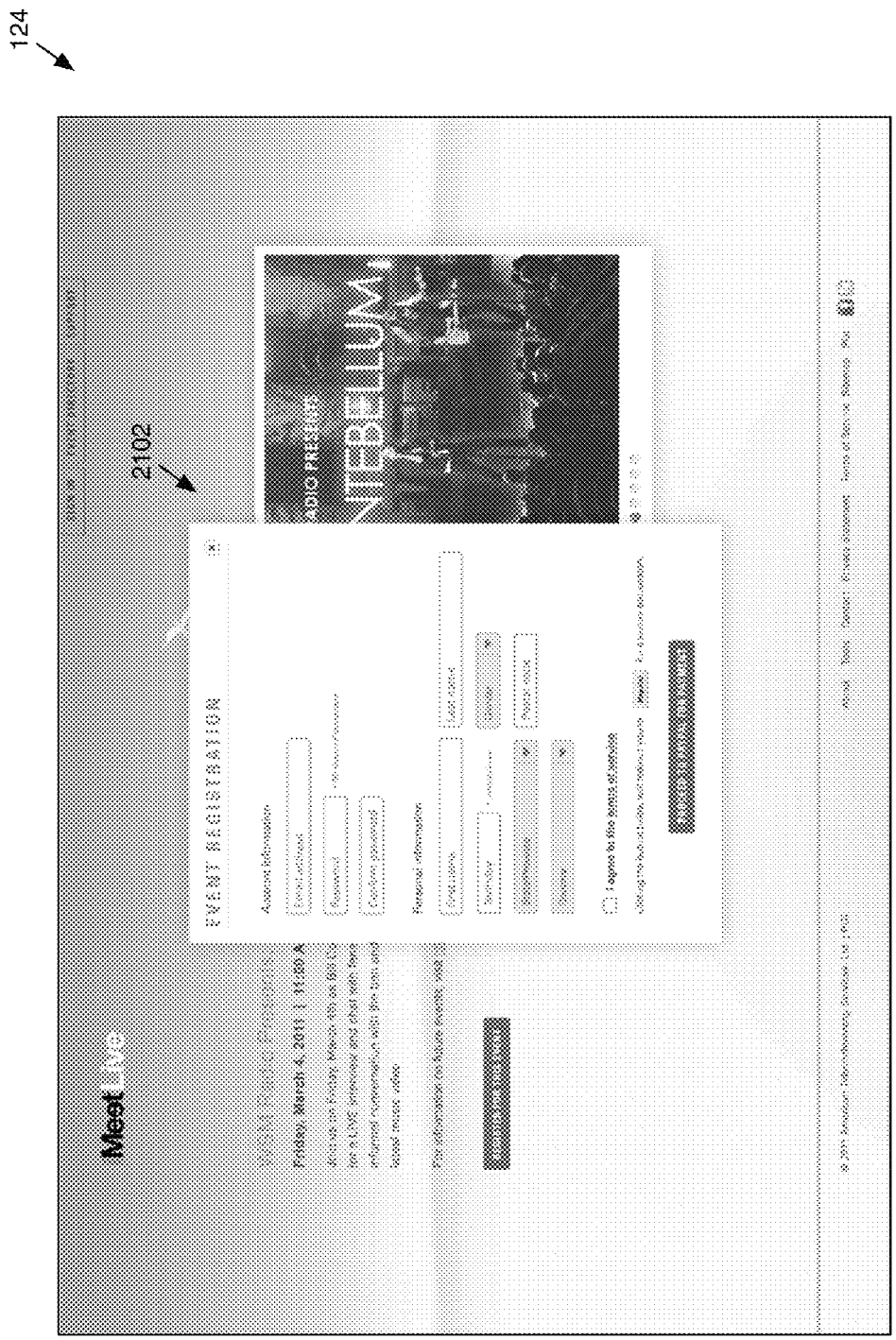
FIG. 21 is an event registration screen displayed in a viewer user interface.
Figure 22:
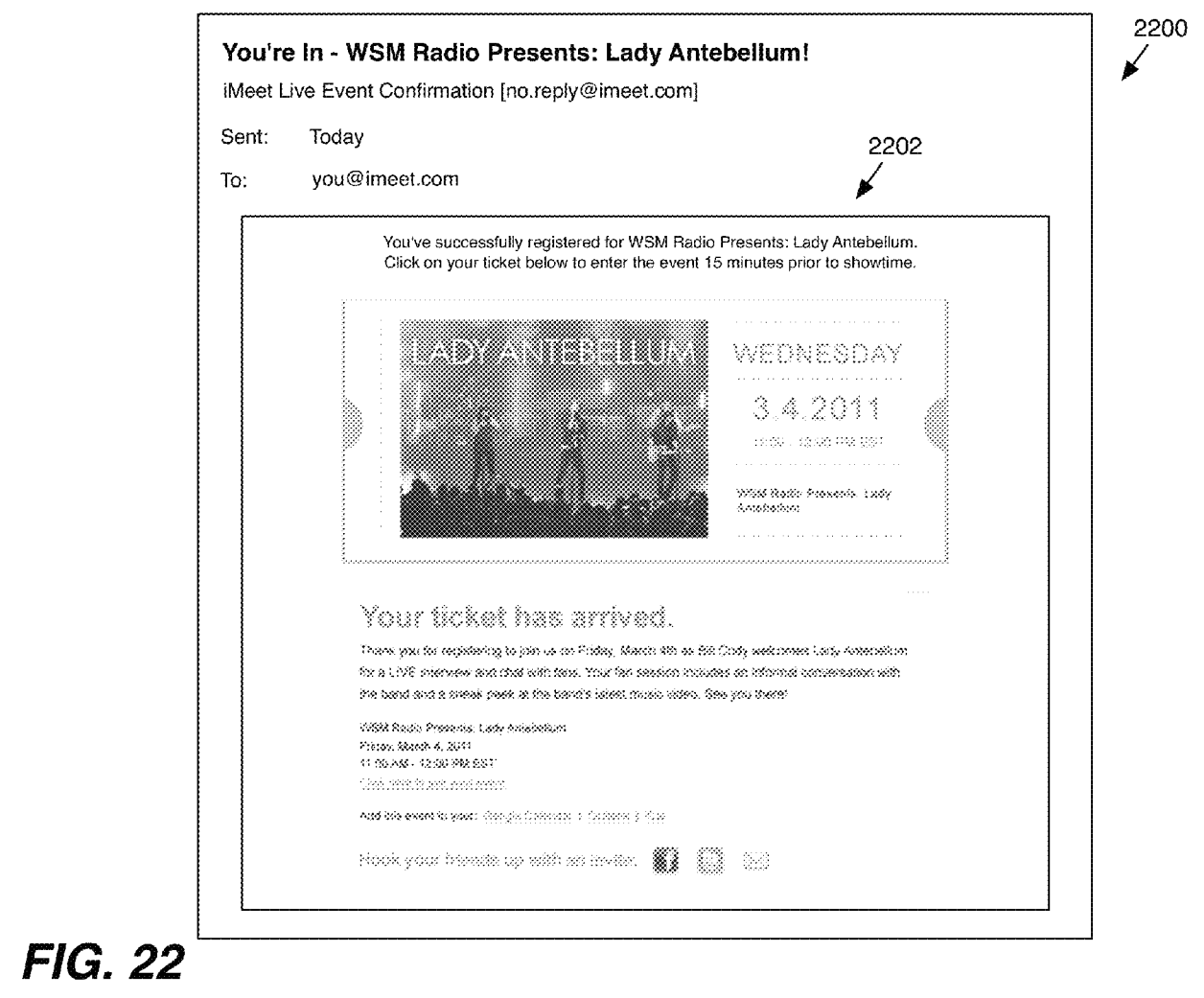

FIG. 21 illustrates an embodiment of the viewer user interface 124 for enabling viewers 110 to register for an online event 111. The event producer 106 may promote the online event 111 through social networking channels or by other means (e.g., email, SMS, etc.). The message may include a link to an event registration page associated with the viewer user interface 124. The event registration page may include promotional information about the online event, date/time, and an event registration panel 2102 prompting the viewer 110 to specify account information, personal information, and payment information (if the event has a fee) for registering for the event. After registering for the online event 111, a confirmation email or other message 2200 (FIG. 22) may be sent to the viewer 110. The confirmation message 2200 may include additional information 2202 to promote the online event 111.

Figure 23:
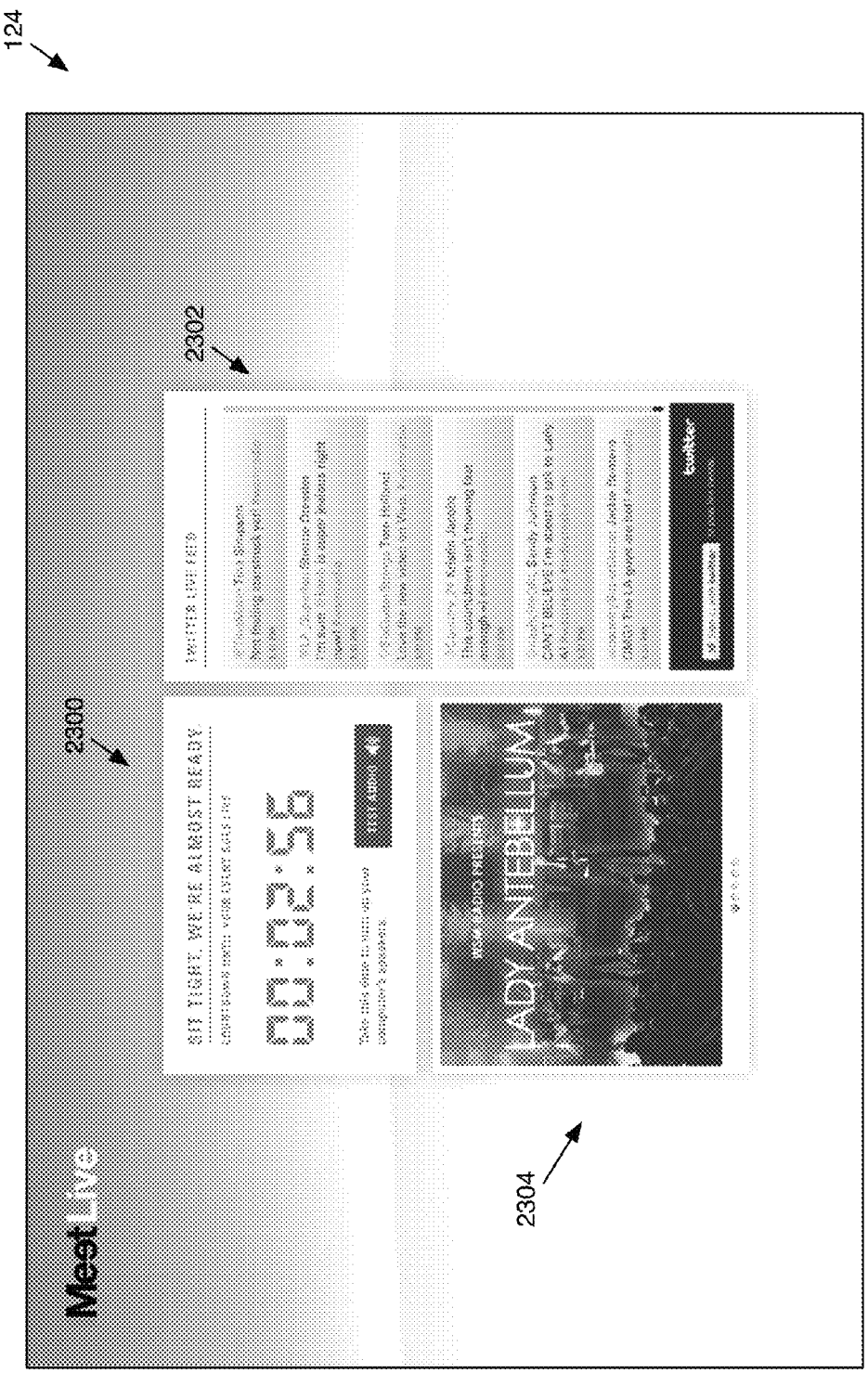
FIG. 23 illustrates an embodiment of a "waiting room" functionality provided via the viewer user interface before an online event begins.

FIG. 23 illustrates an embodiment of a "waiting room" that may be displayed via the viewer user interface 124 if the viewer 110 joins the online event 111 prior to the scheduled start time. To enhance the user experience, the "waiting room" may include a social networking panel 2302 for enabling early attendees to interact and discuss the upcoming online event 111. The "waiting room" may include a countdown timer panel 2300 indicating when the online event 111 goes live. A further panel 2304 may present additional promotional information (e.g., introductory or teaser videos or any other information).

The systems, methods, and computer programs described above in connection with FIGS. 1-23 may be further configured to enable the event producer 106 to create, and control the online event 111 according to, a predefined event production script. As described below in more detail, the event production script generally comprises a series of production prompts, notifications, recommendations, etc. that may be defined while creating the online event 111. During the online event 111, the event production script is read, monitored, or executed (e.g., via the event management/production module(s) 118) and the corresponding production prompts may be presented to the event producer 106 according to a production timeline or schedule via the event production user interface 120. It should be appreciated that the production prompts may improve the convenience, ease-of-use, or efficiency of the production environment by, for example, eliminating some of the administrative burden of producing the online event 111 or otherwise simplify certain aspects of the production process. The production prompts conveniently remind the event producer 106, at the appropriate scheduled time along a production timeline, of any desirable predefined actions associated with the production of the online event 111. The production prompts may be configured to automatically initiate production commands and actions. Alternatively, the production prompts may include a notification or message describing the scheduled action and may prompt the event producer 106 to make a user interface selection to initiate the scheduled action.

Figure 24:
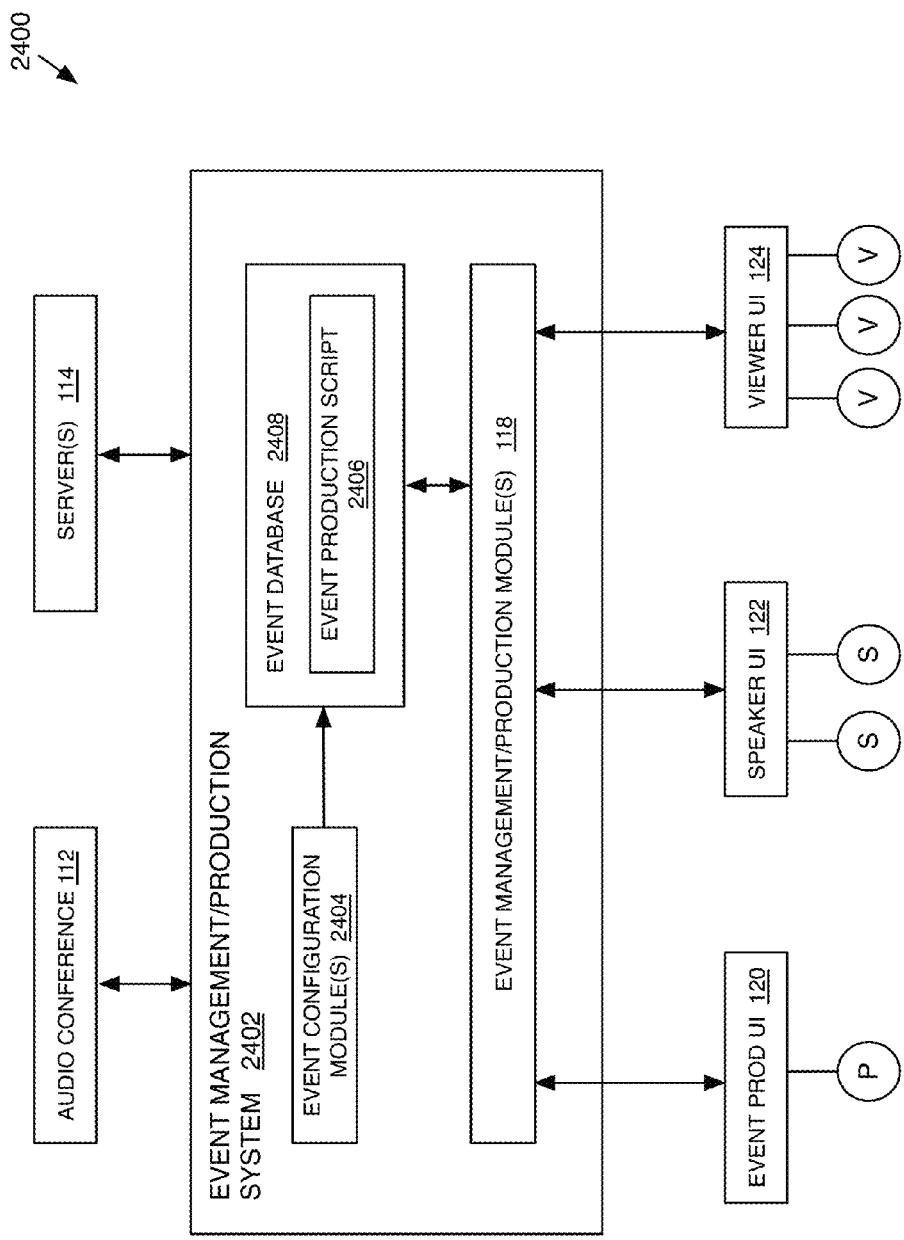
FIG. 24 is block diagram illustrating another embodiment of a system comprising the event management/production modules for managing the online event via an event production script.

FIG. 24 illustrates an embodiment of a system 2400 for implementing the production scripting and control functionality. System 2400 may be generally configured in the manner described above. An event management/production system 2402 may incorporate the event management/production module(s) 118 and further comprise event configuration module(s) 2404 and an event database 2408. The event configuration module(s) 2404 comprise the logic or functionality for enabling the event producer 106 to create an event production script 2406, which may be stored in the event database 2408. The event production script 2406 may be created via the event production user interface 120 or a separate user interface, website, etc. associated with the conferencing system 102. During an online event 111, the event management/production module(s) 118 accesses the event production script 2406 via the event database 2408 to present the predefined production prompts according to the production timeline.

Figure 25:
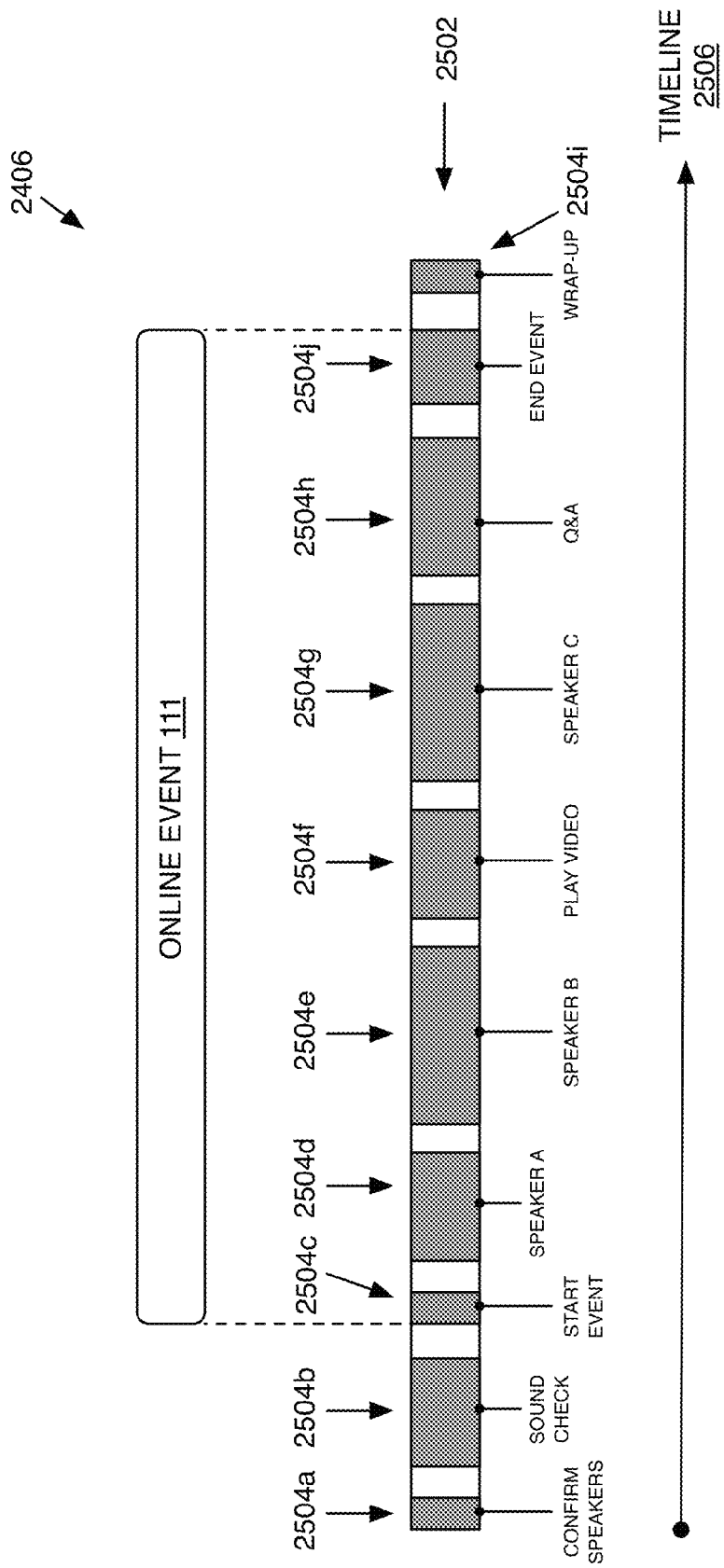
FIG. 25 illustrates an embodiment of the event production script of FIG. 24.

FIG. 25 illustrates a diagram representing an embodiment of the event production script 2406. The online event 111 may be scheduled with a start time and an end time represented by the dashed lines. The event production script 2406 defines a series 2502 of predefined production prompts 2504 along a production timeline 2506. In the example of FIG. 25, the series 2502 comprises the following prompts, as created by the event producer 106 or other person: a confirm speakers prompt 2504*a*, a speaker soundcheck prompt 2504*b*, a start event prompt 2504*c*, a speaker prompt 2504*d* (for a first speaker A), a speaker prompt 2504*e* (for a second speaker B), a play video prompt 2504*d*, a speaker prompt 2504*g* (for a third speaker C), a question-and-answer (Q&A) prompt 2504*h*, an end event prompt 2504*j*, and a wrap-up prompt 2504*i*. It should be appreciated that the order and types of prompts may be modified to accommodate various types of online events 111, as well as the preferences of the event producers 106.

The confirm speakers prompt 2504*a* may remind the event producer to confirm the attendance of each of the scheduled speakers 108 for the online event. The speaker soundcheck prompt 2504*b* may include instructions to the event producer 106 and/or the speakers 108 for establishing, testing, and confirming a working audio connection to the audio conference 112 prior to starting the online event 111. The speaker prompts 2504*d*, 2504*e*, and 2504*g* may remind the event producer 108, for example, when the speaker's allotted time is about to expire, to introduce the next speaker, switch speaker audio connections, or update the viewer user interface 124 to identify the proper speaker 108. The play video prompt 2504*d* may correspond to a planned introduction and presentation of a video in the viewer user interface 124. The play video prompt 2504*d* may include a link to automatically launch the video file or may automatically play the video. Similar prompts may be provided for presenting any suitable content (e.g., documents, presentations, audio, video, screen sharing, etc.).

The Q&A prompt 2504*h* may remind the event producer 106 of a predetermined time to begin a Q&A session with the viewers 110, as described above. It should be appreciated that further prompts 2504 may be provided for launching any desirable applications, functionality, or content.

The wrap-up prompt 2504*i* may by displayed after the online event 111 has ended for enabling the event producer 106 and speakers 108 to have follow-up discussions about the online event 111.

FIG. 26 illustrates an exemplary data structure 2600 for implementing the event production script 2406 in the event database 2408. Each production prompt 2504 may be identified with a description 2602 of the item, action, command, etc. Start and end times 2604 and 2606 may be defined for determining timestamps or time ranges associated with the production timeline 2506 when the prompt 2504 is to be presented via the event production user interface 120. As mentioned above, the event production script 2406 may support various types 2608 of production prompts, including, for example, agenda items, topics, speaker times, event actions, applications, content sharing, etc. A URL 2610 may be provided for identifying the location and convenient launching of various types of documents. The auto/prompt indicator 2612 may be used to control whether the production prompt 2504 is to be automatically executed at a predetermined time or whether a notification and confirmation by the event producer 106 is preferred.

Figure 27:
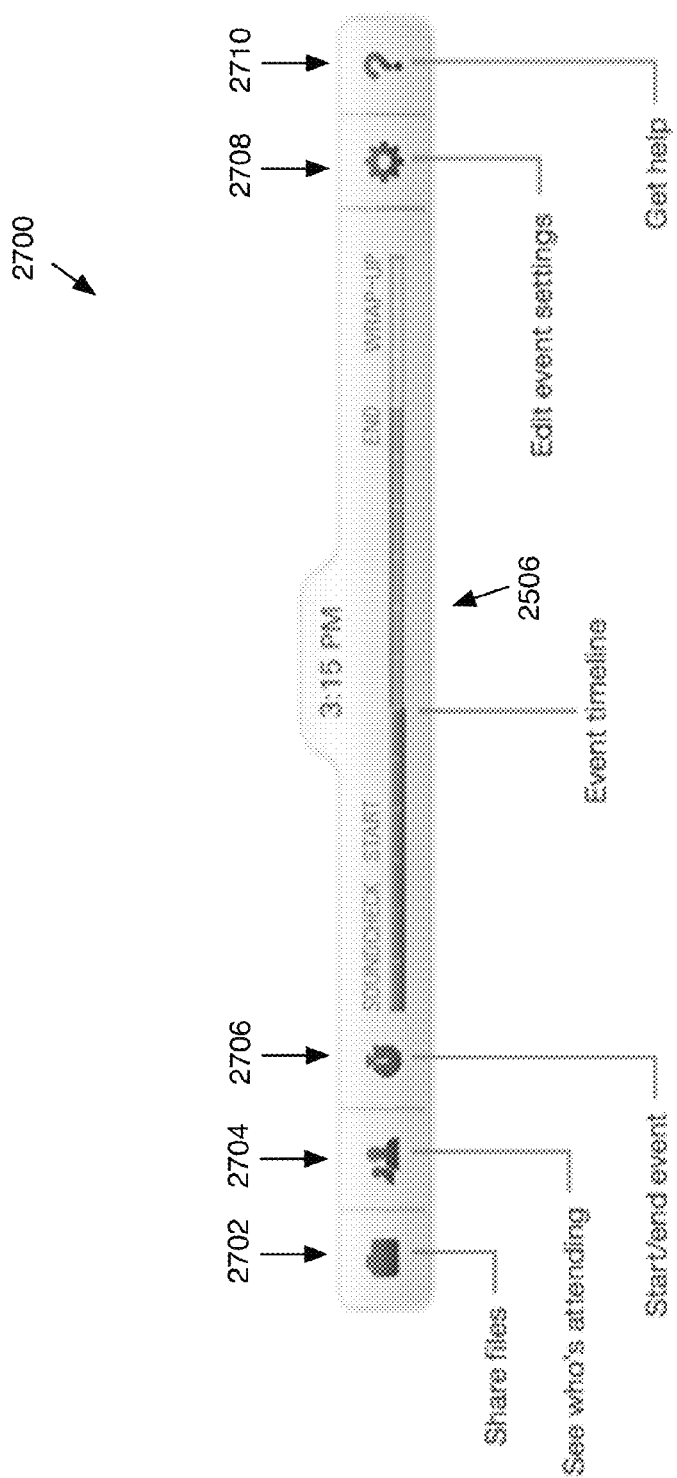
FIG. 27 illustrates an embodiment of a user interface control for displaying the production prompts in relation to a production timeline.

The presentation of the production prompts 2504 may be implemented in any desirable manner. FIG. 27 illustrates an embodiment in which a timeline control 2700 is displayed in the event production user interface 120. The timeline control 2700 visually identifies the production prompts 2504 in relation to the production timeline 2506 (FIG. 25). The timeline control 2700 may further comprise user interface controls for conveniently selecting various features. A share files button 2702 may launch a screen for selecting files to be presented to the viewers 110 in the viewer user interface 124. A viewers button 2704 may display information about the viewers 110 currently attending or registered for the online event 111. A start/end event button 2706 may provide a quick control for starting and ending the online event directly from the timeline control 2700. A settings button 2708 may launch a settings panel or screen for editing event details, inviting additional viewers or speakers, editing the event production script 2406, or other desirable settings. A help button 2710 may provide quick assistance with navigating the production environment.

Figure 28:
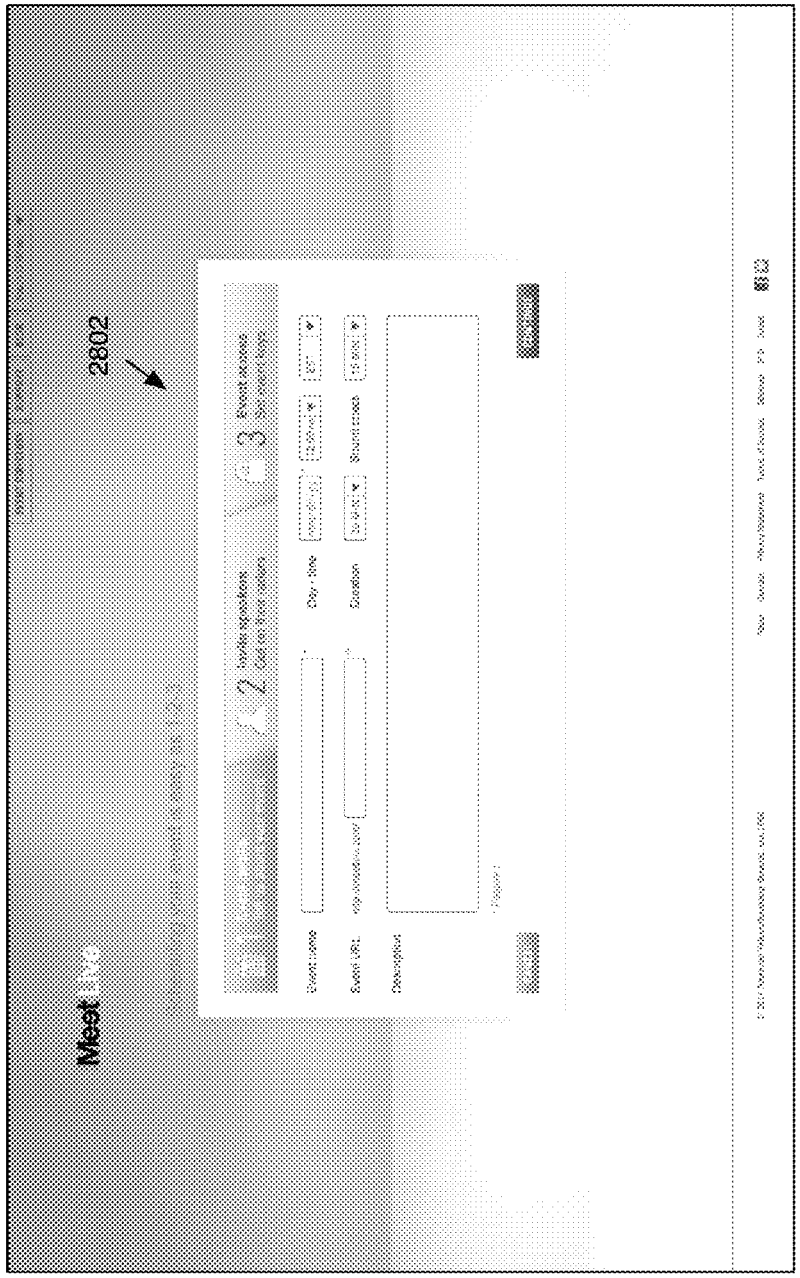
FIG. 28 is a first screen shot associated with an embodiment of the event configuration module(s) for specifying event details.
Figure 29:
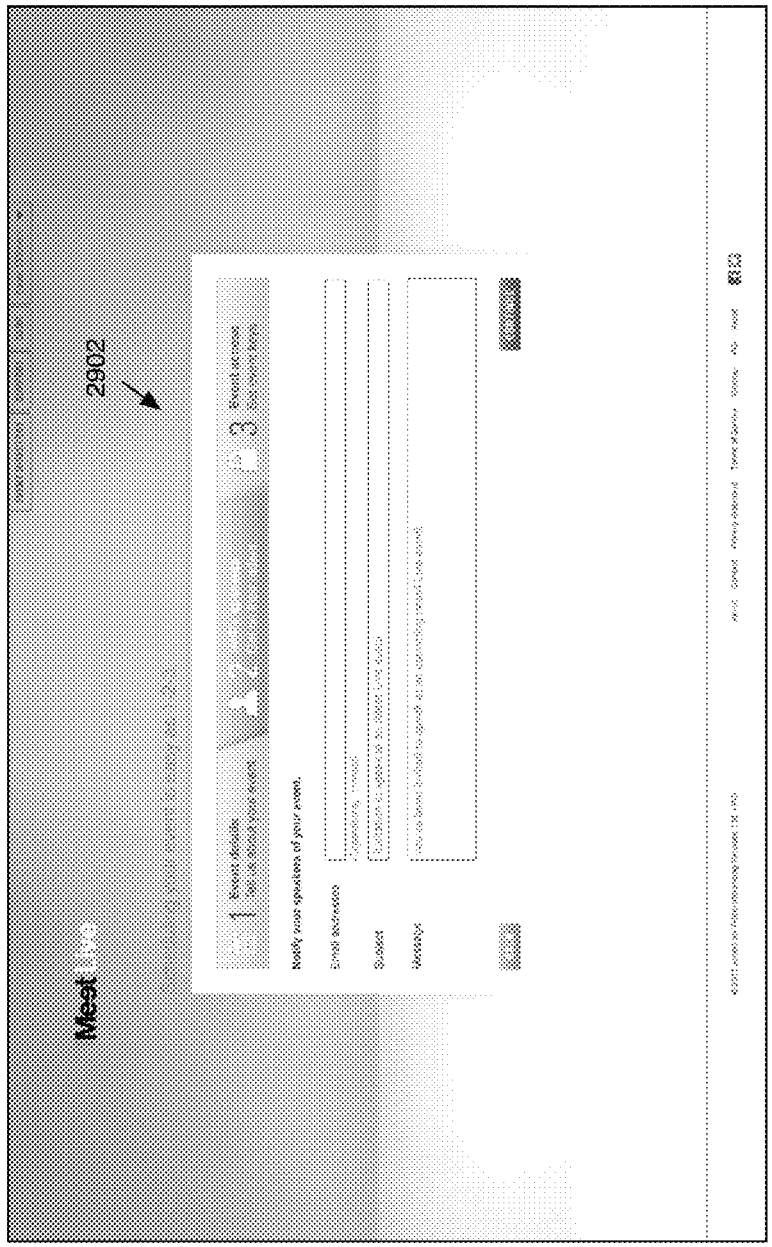
FIG. 29 is a second screen shot associated with an embodiment of the event configuration module(s) for inviting speakers to the online event.
Figure 30:
FIG. 30 is a third screen shot associated with an embodiment of the event configuration module(s) for configuring event access details.

Referring to FIGS. 28-35, the event configuration module(s) 2404 may provide a convenient scheduling wizard for configuring the online event 111 via the event production user interface 120. FIG. 28 illustrates a screen shot 2800 with a tabbed interface 2802 for scheduling the online event 111 in three steps. In a first step, the event producer 106 may specify an event name, event URL for accessing the event via the conferencing system 102, date, time, duration, description, and soundcheck time for the online event 111. In a second step (screen 2902—FIG. 29), the event producer 106 may invite or otherwise notify speakers via an email message. In a third step (screen 3002—FIG. 30), the event producer 106 may specify separate secure keys for speakers and viewers.

Figure 31:
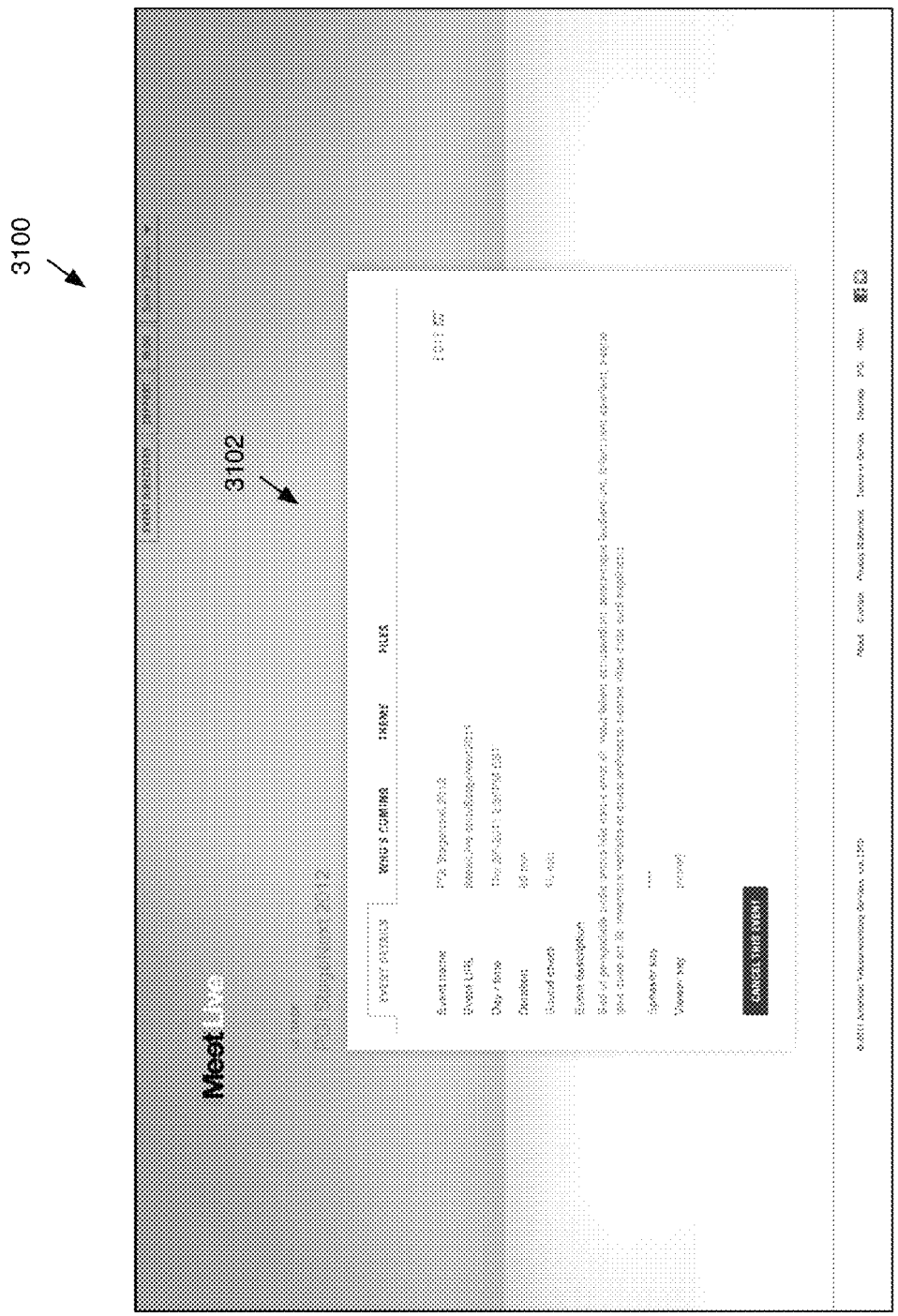
FIG. 31 is a fourth screen shot associated with an embodiment of the event configuration module(s) for viewing event details.
Figure 32:
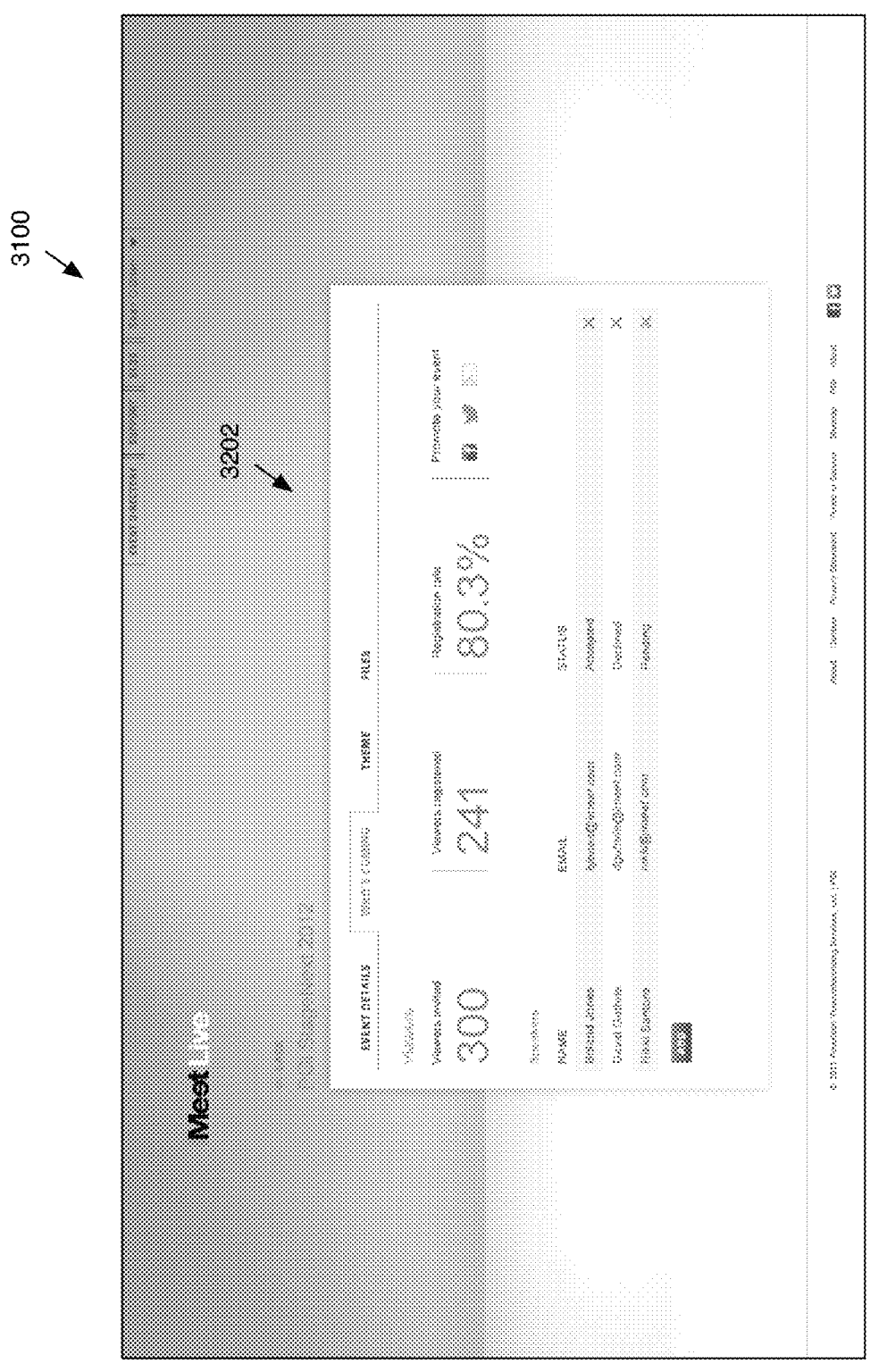

FIG. 31 illustrates a screen shot 3100 with another tabbed interface 3102 for configuring additional event details. FIG. 31 illustrates an event details tab for viewing the previously configured event details or canceling the event. FIG. 32 illustrates a "who's coming" tab 3202 for displaying various viewer and/or speaker details (e.g., # of invites, # of registered viewers, a registration rate, speaker names, speaker email addresses, speaker status, etc.). Additional buttons may be displayed for promoting the online event via, for example, social networking sites or emails.

Figure 33:
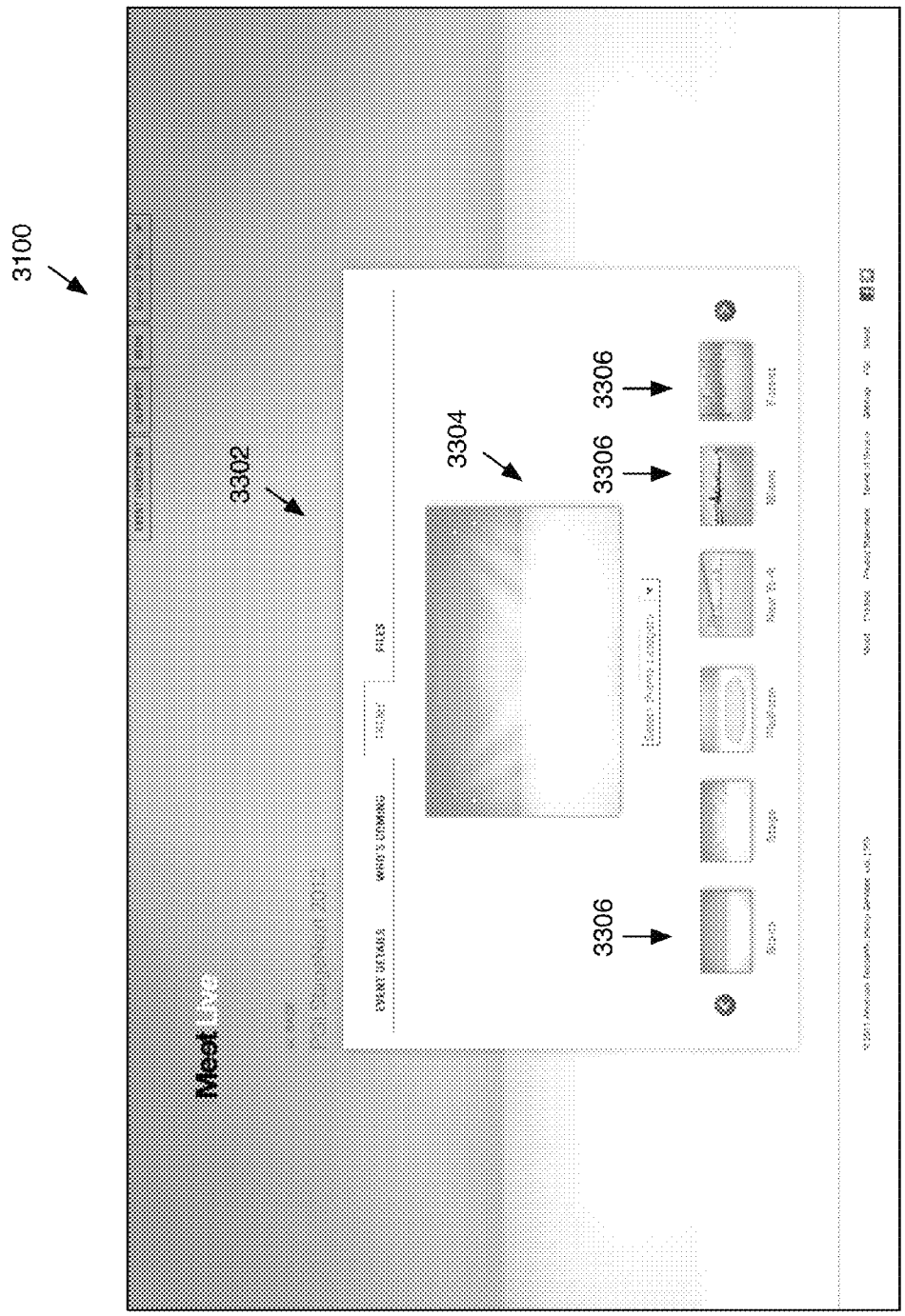
FIG. 33 is a sixth screen shot associated with an embodiment of the event configuration module(s) for configuring a theme for the online event.

FIG. 33 illustrates a "themes" tab 3302 for selecting a background for the viewer user interface 124. The background may be selected from a list of predefined background images 3306 or based on theme categories. The event producer 106 may also upload an image from a profile 116 or one stored on the computing device 104*a*. A preview 3304 of the current selected background may be displayed.

Figure 34:
FIG. 34 is a seventh screen shot associated with an embodiment of the event configuration module(s) for specifying documents to be shared during the online event.

FIG. 34 illustrates a "files" tab 3402 for specifying one or more files (e.g., PDF files 3406 and 3404) to be presented during the online event 111. Any type and number of files may be added (add button 3408) and made available for presentation during the online event 111.

Figure 35:
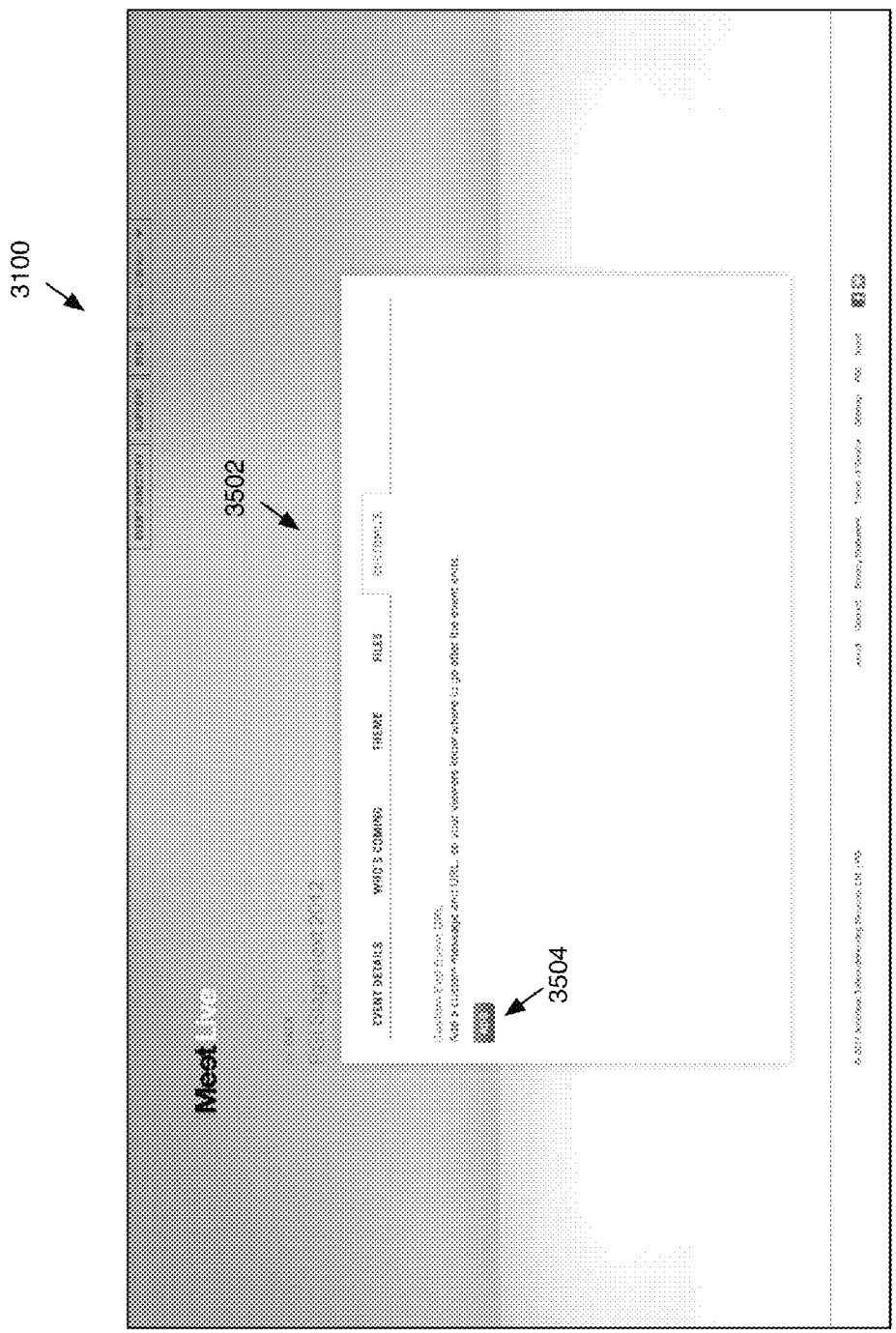
FIG. 35 is an eighth screen shot associated with an embodiment of the event configuration module(s) for customizing an end event URL.

FIG. 35 illustrates a "customize" tab 3502 for adding, via add button 3504, a customized message to viewers 110 after the online event 111 is ended. A custom message comprising text, graphics, audio, and/or video may be defined or a URL may be provided.

Figure 36:
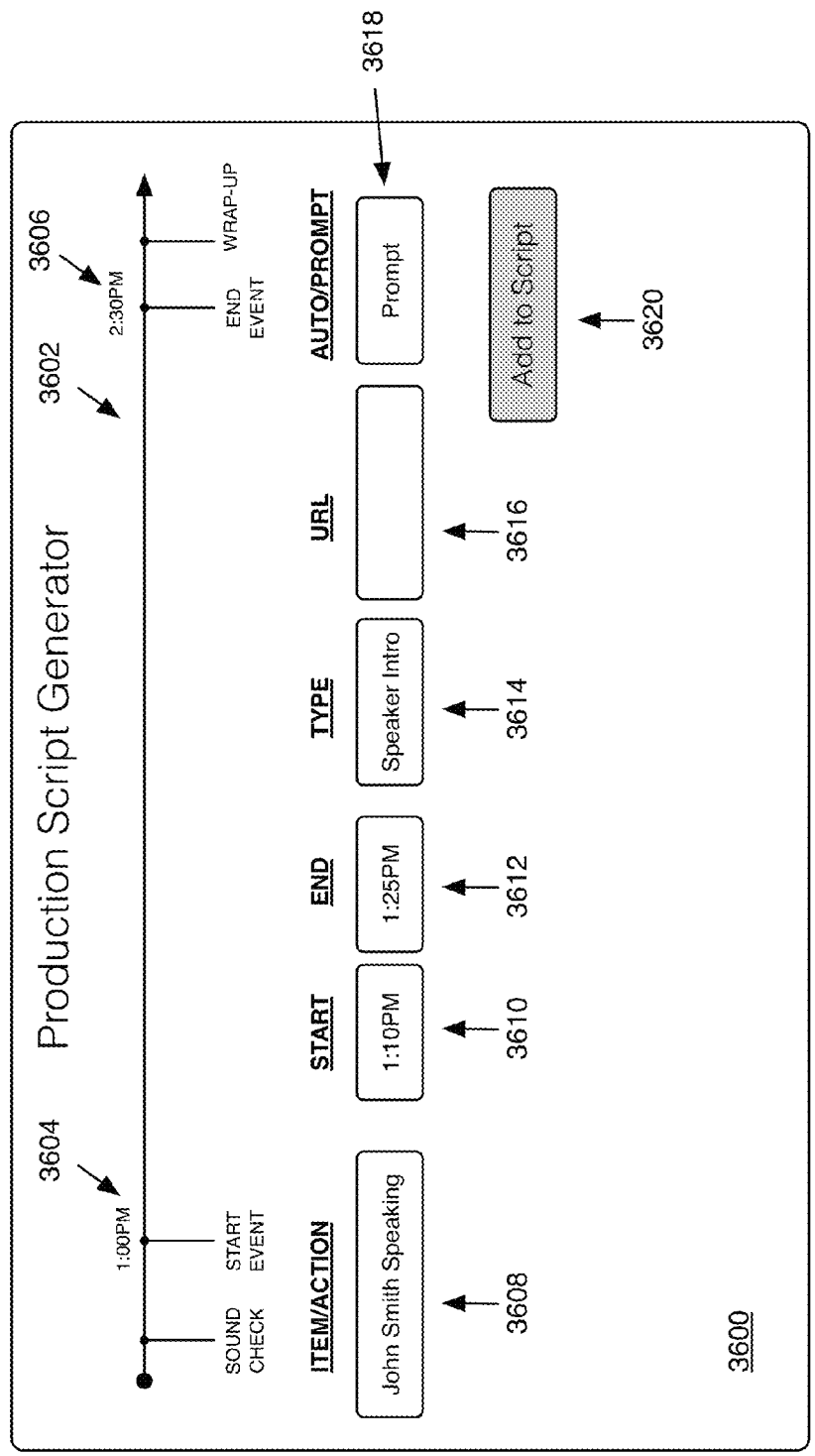
FIG. 36 illustrates an embodiment of a user interface control for configuring the event production script.
Figure 37:
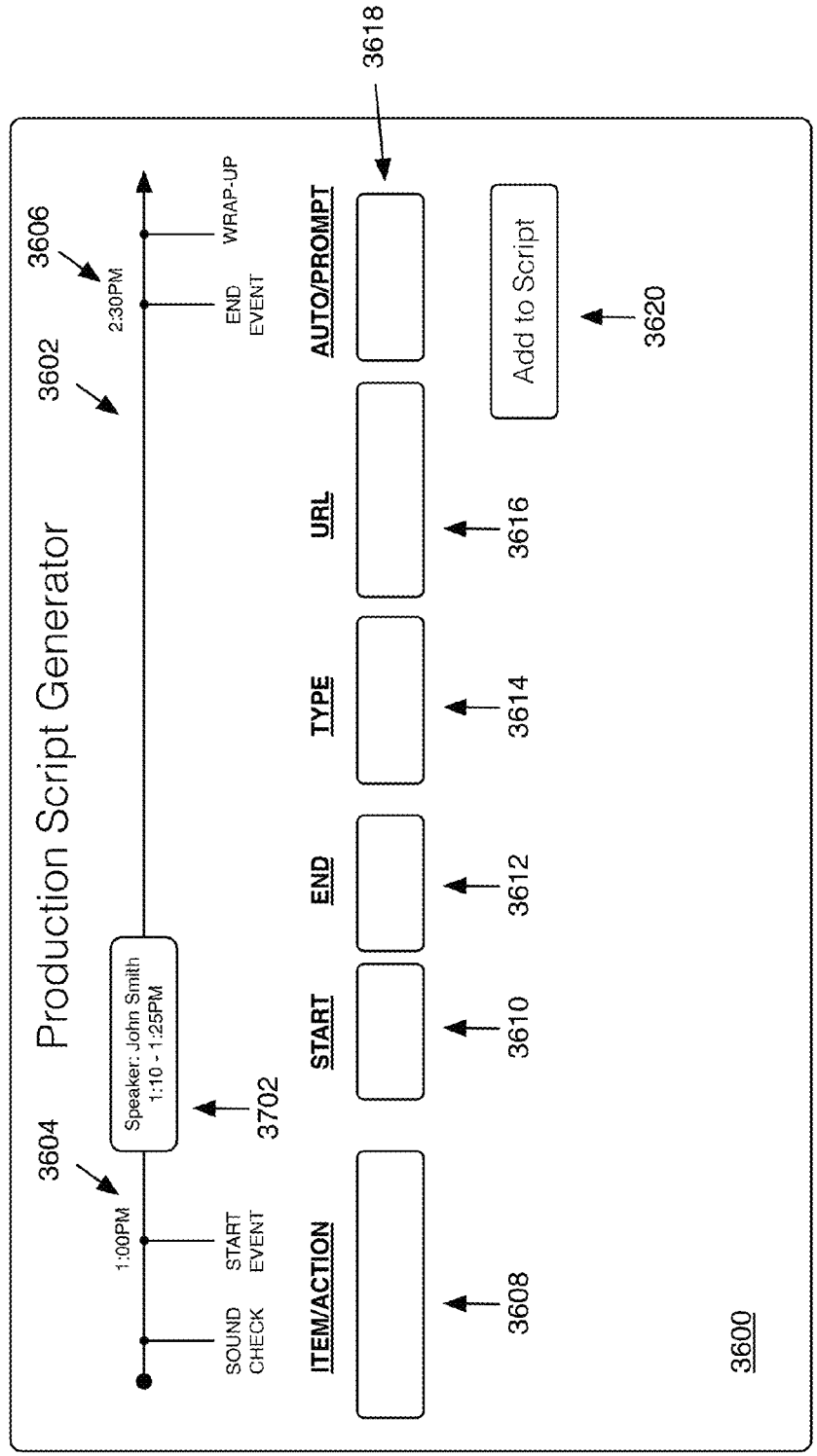
FIG. 37 illustrates the user interface control of FIG. 36 after the production prompt has been added to the production timeline.

FIGS. 36 and 37 illustrate screens shots of an embodiment of a production script generator tool 3600 that may be used to create the event production script 2406. The production script generator tool 3600 may be integrated with the scheduling wizard described above, the event production user interface 120, or otherwise. The production script generator tool 3600 displays a representation 3602 of the production timeline 2506. By default, the scheduled soundcheck, event start, event end, and wrap-up times may be displayed, as identified by reference numerals 3604 and 3606, respectively. A production prompt 2504 may be created by specifying one or more of the data fields illustrated in the data structure 2600 (FIG. 26) via input controls 3608, 3610, 3612, 3614, 3616, and 3618. As illustrated in FIG. 37, after specifying the data fields, the production prompt 2504 may be added to the representation 3602 by selecting the "add to script" button 3620. FIG. 37 shows a speaker prompt 3702 added to the representation 3602 of the production timeline 2506. Additional production prompts 2504 are created in a similar manner.

Figure 38:
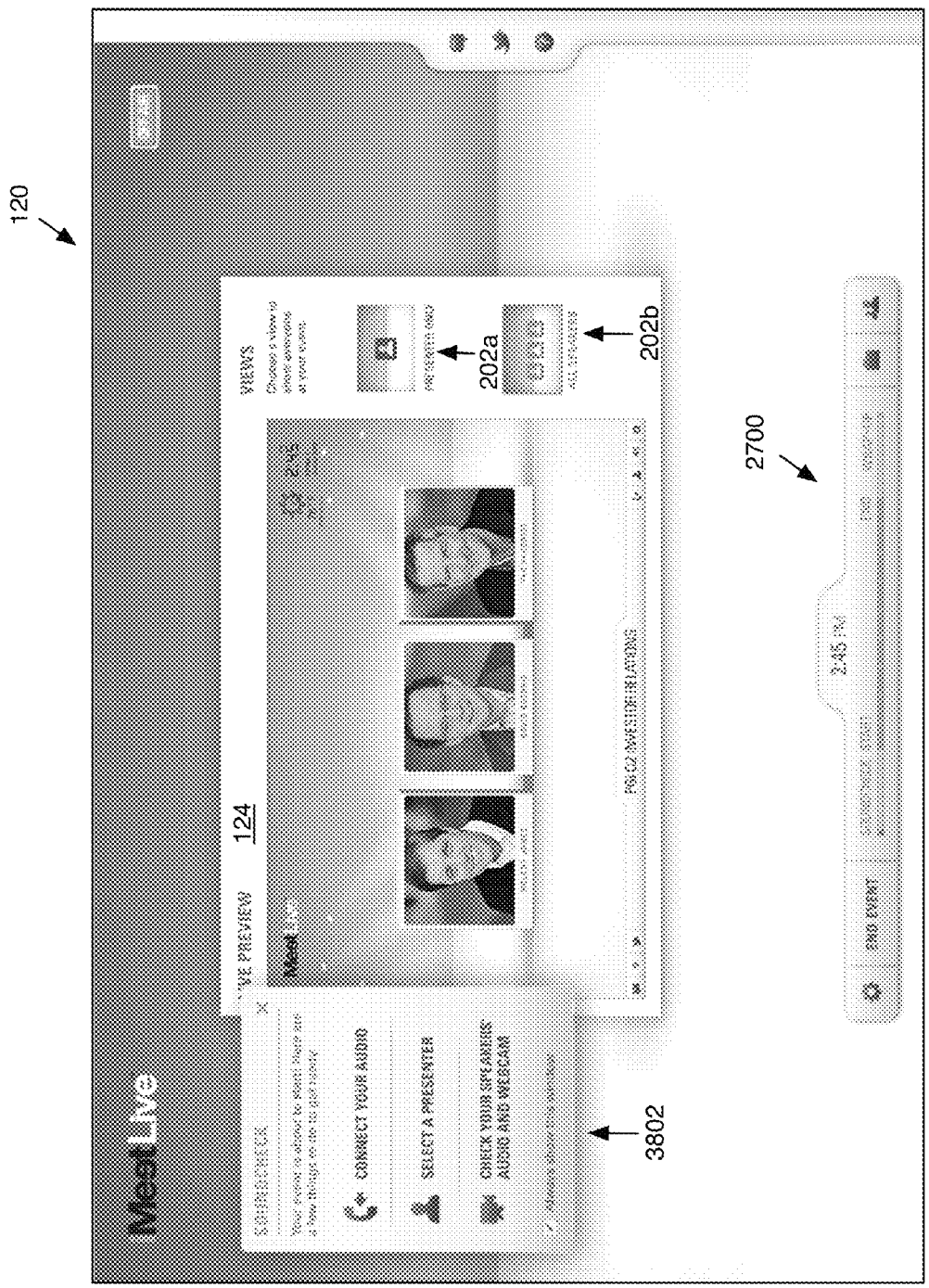
FIG. 38 is a screen shot illustrating an embodiment of the event production user interface displaying a soundcheck prompt.

FIGS. 38-45 illustrate additional exemplary embodiments for presenting various types of production prompts 2504 in the event production user interface 120 during the online event 111 according to the event production script 2406. In FIG. 38, the event management/production module 118 has identified a soundcheck prompt 2504b (FIG. 25). In response, the event production user interface 120 may display a window 3802, prompting the event producer 106 to perform a soundcheck for each of the speakers 108. From the window 3802, the event producer 106 may, for example, connect their audio, select a presenter, and check audio and/or web cams for each speaker.

Figure 39:
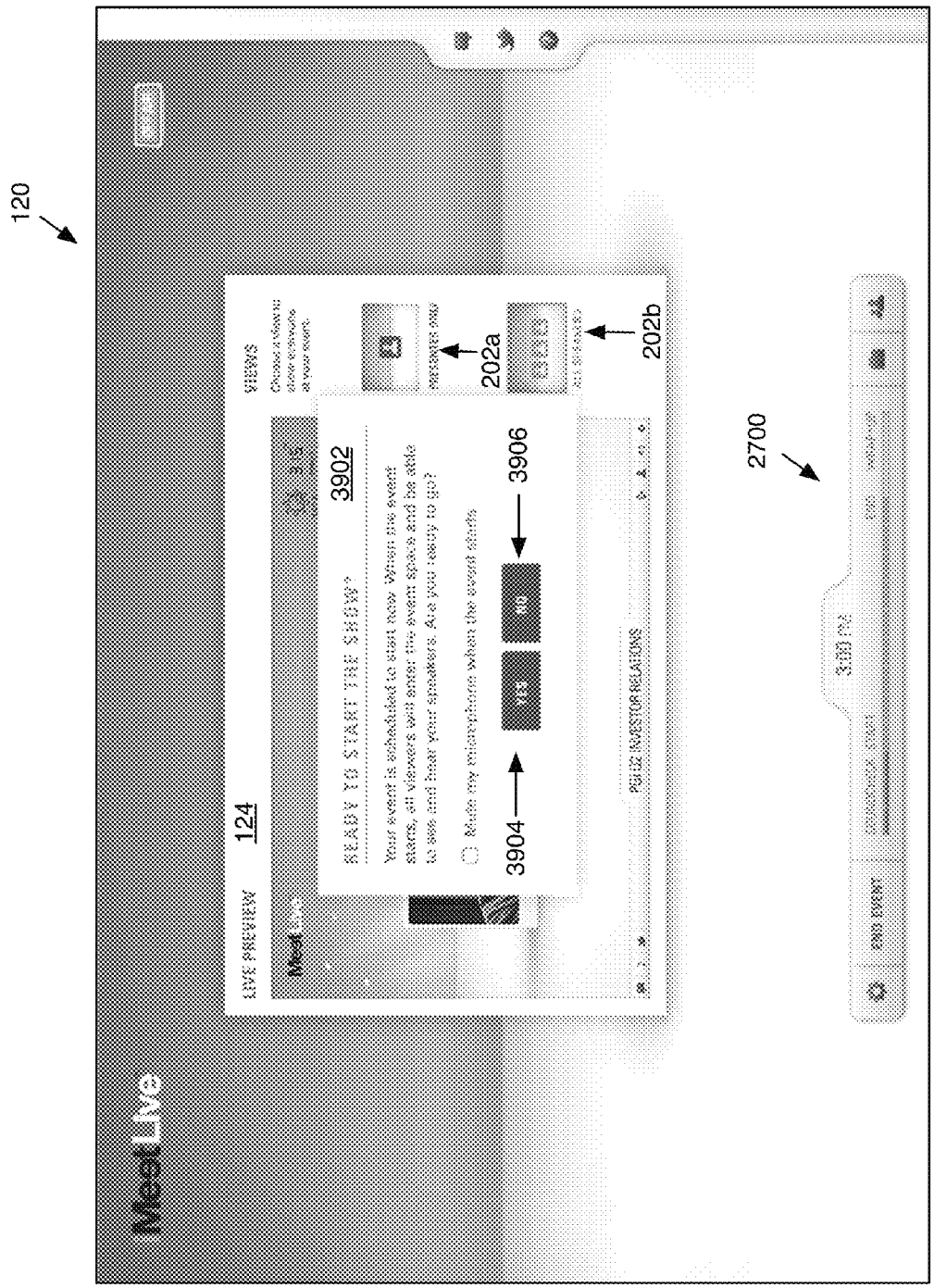
FIG. 39 is a screen shot illustrating an embodiment of the event production user interface for displaying a start event prompt.
Figure 40:
FIG. 40 is a screen shot illustrating an embodiment of a waiting room screen for the viewer user interface.

In FIG. 39, the event management/production module 118 has identified a start event prompt 2504c (FIG. 25). In response, the event production user interface 120 may display a window 3902 to remind the event producer 106 that the online event 111 is scheduled to start. The online event 111 may be started by selecting the "yes" button 3904. If the starting time should be delayed because, for example, the soundcheck is still in progress, the "no" button 3906 may be selected. If the online event is delayed, viewers may remain in the "event lobby" illustrated in FIG. 40 and a new starting time may be displayed.

Figure 41:
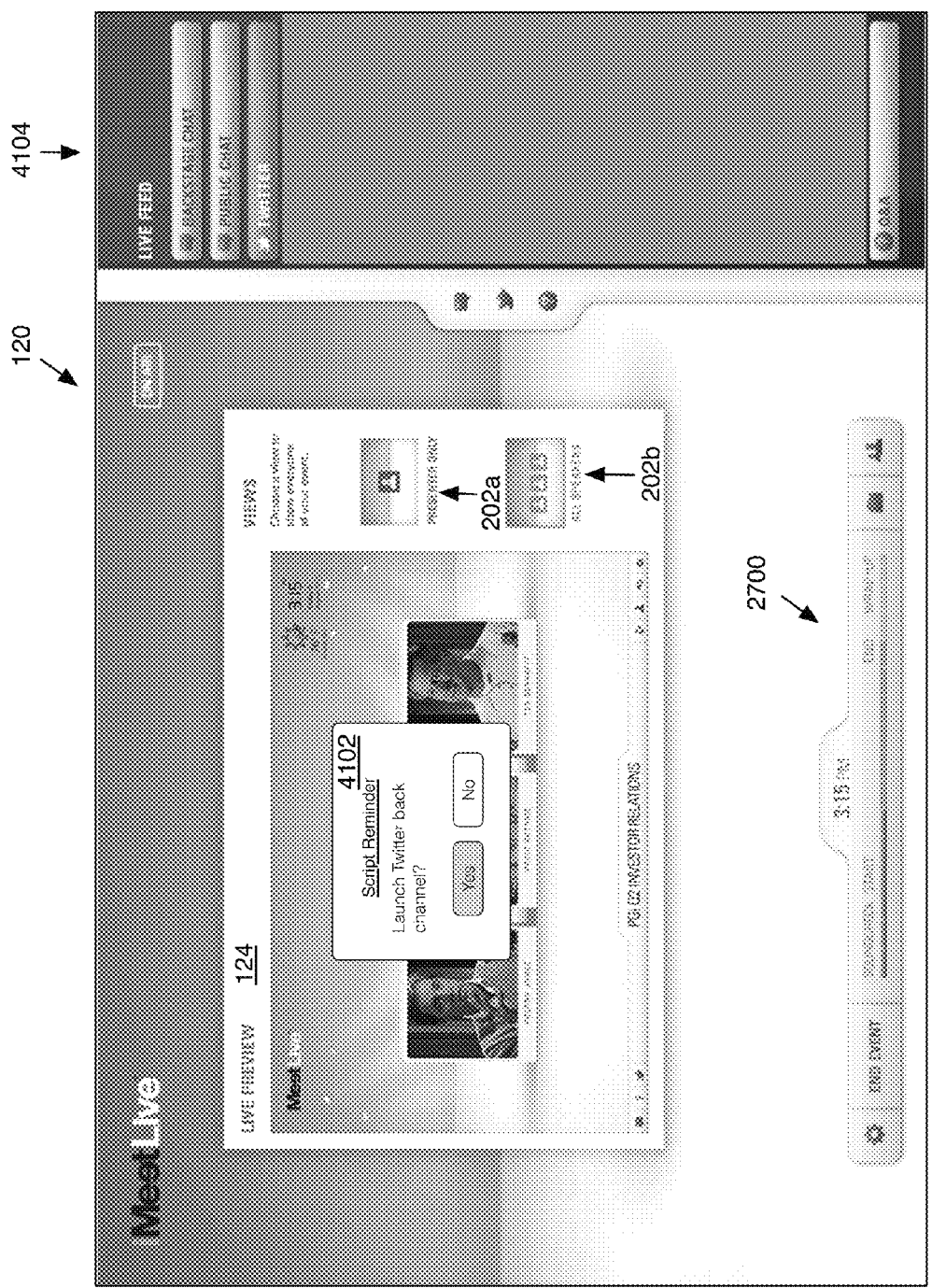
FIG. 41 is a screen shot illustrating an embodiment of the event production user interface for displaying a production prompt to launch a social networking application.
Figure 42:
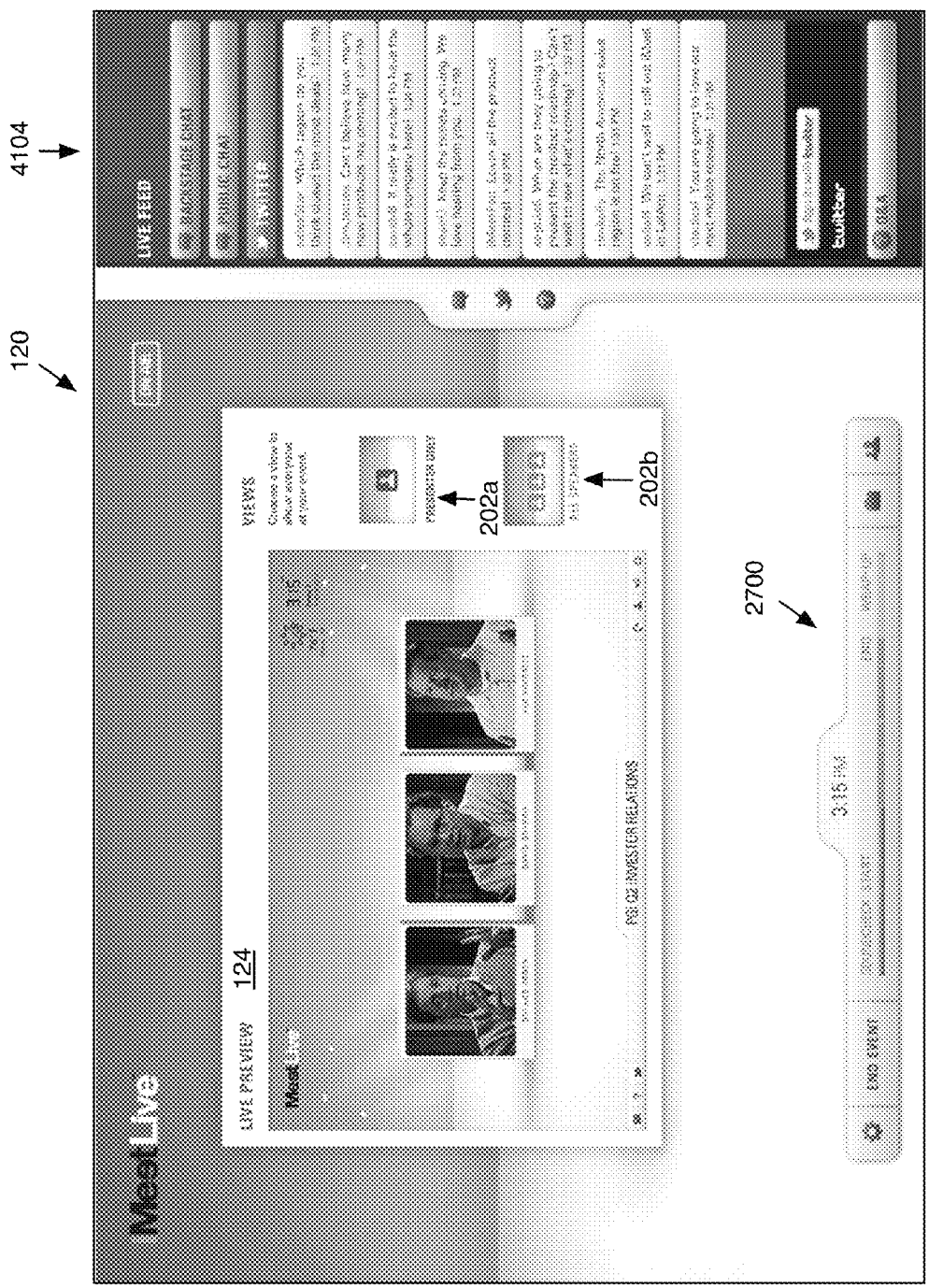
FIG. 42 illustrates the event production user interface of FIG. 41 after the event producer has initiated the social networking production prompt.

In FIG. 41, the event management/production module 118 has identified a production prompt 2504 indicating that the social networking "back channel" should be initiated. In response, the event production user interface 120 may display a window 4102 with prompts for enabling the event producer to initiate the corresponding application. FIG. 42 illustrates the screen shot of FIG. 41 after the event producer 106 has launched the "back channel" in live feed panel 4104. It should be appreciated, however, that the "back channel" may be made available throughout the online event 111, if desired.

Figure 43:
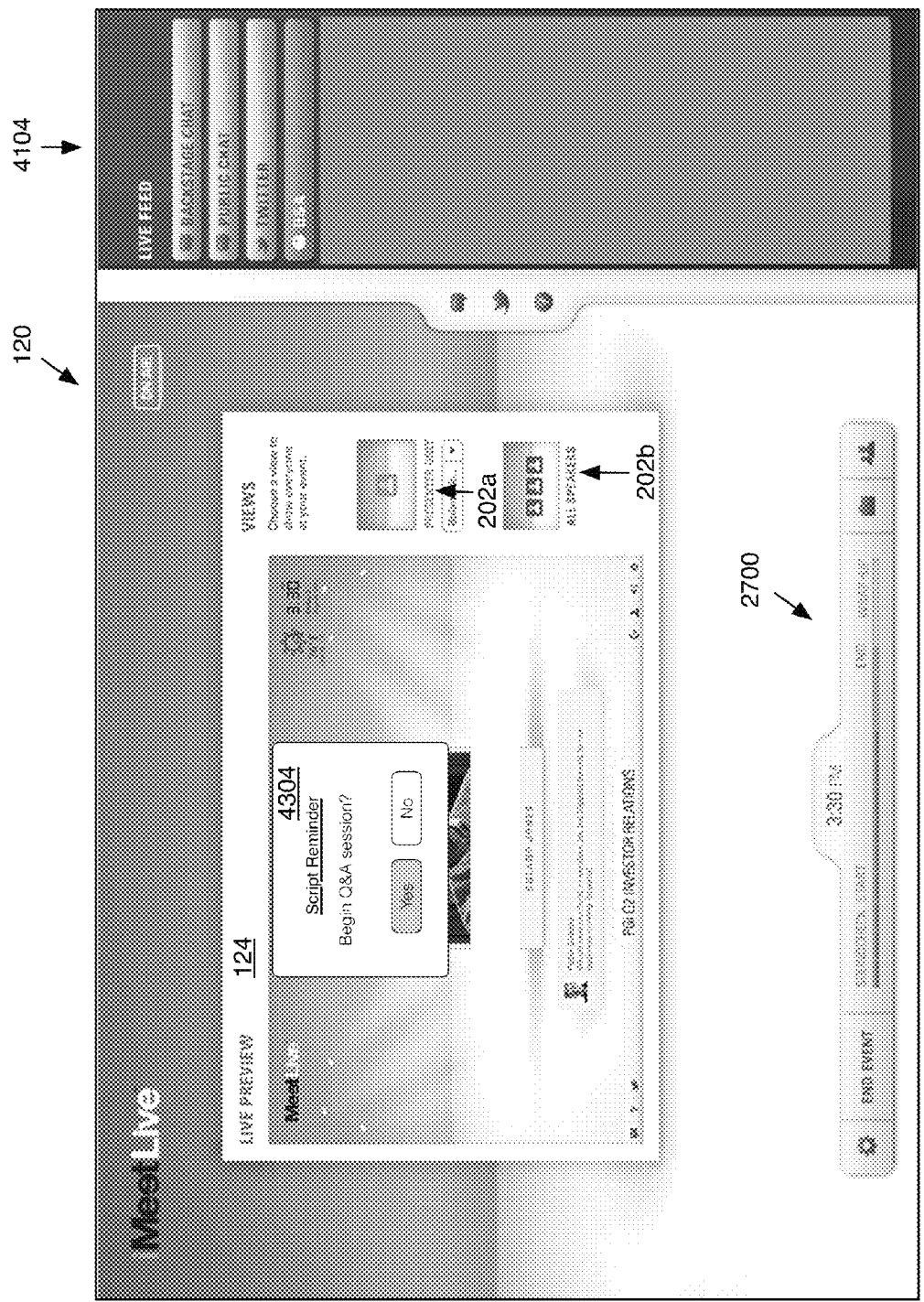
FIG. 43 is a screen shot illustrating an embodiment of the event production user interface for displaying a production prompt for beginning a question-and-answer session.
Figure 44:
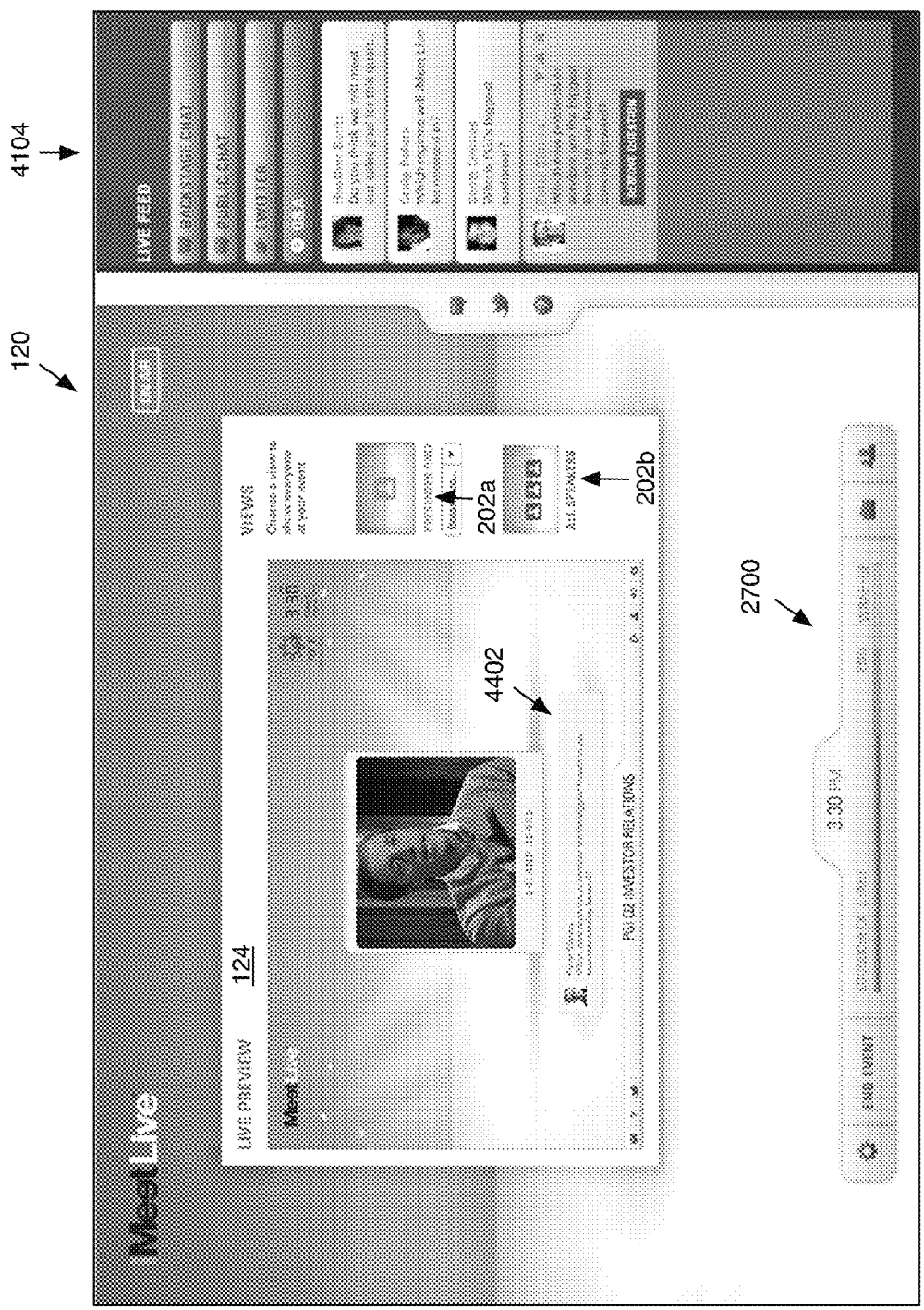
FIG. 44 illustrates the event production user interface of FIG. 43 after the event producer has initiated the Q&A production prompt.
Figure 47:
FIG. 47 illustrates the viewer user interface in response to the event producer initiating the Q&A session.

In FIG. 43, the event management/production module 118 has identified a Q&A production prompt 2504h (FIG. 25). In response, the event production user interface 120 may display a window 4304 reminding the event producer 106 of the scheduled time for a Q&A session. FIG. 44 illustrates the screen shot of FIG. 43 after the event producer has activated the Q&A bar 4104. As illustrated in FIG. 47, when the Q&A session has been initiated by the event producer, the viewer user interface 124 may be updated to display a prompt 4702 to the viewers indicating that the session has begun and they may submit questions via question submission panel 4704.

Figure 45:
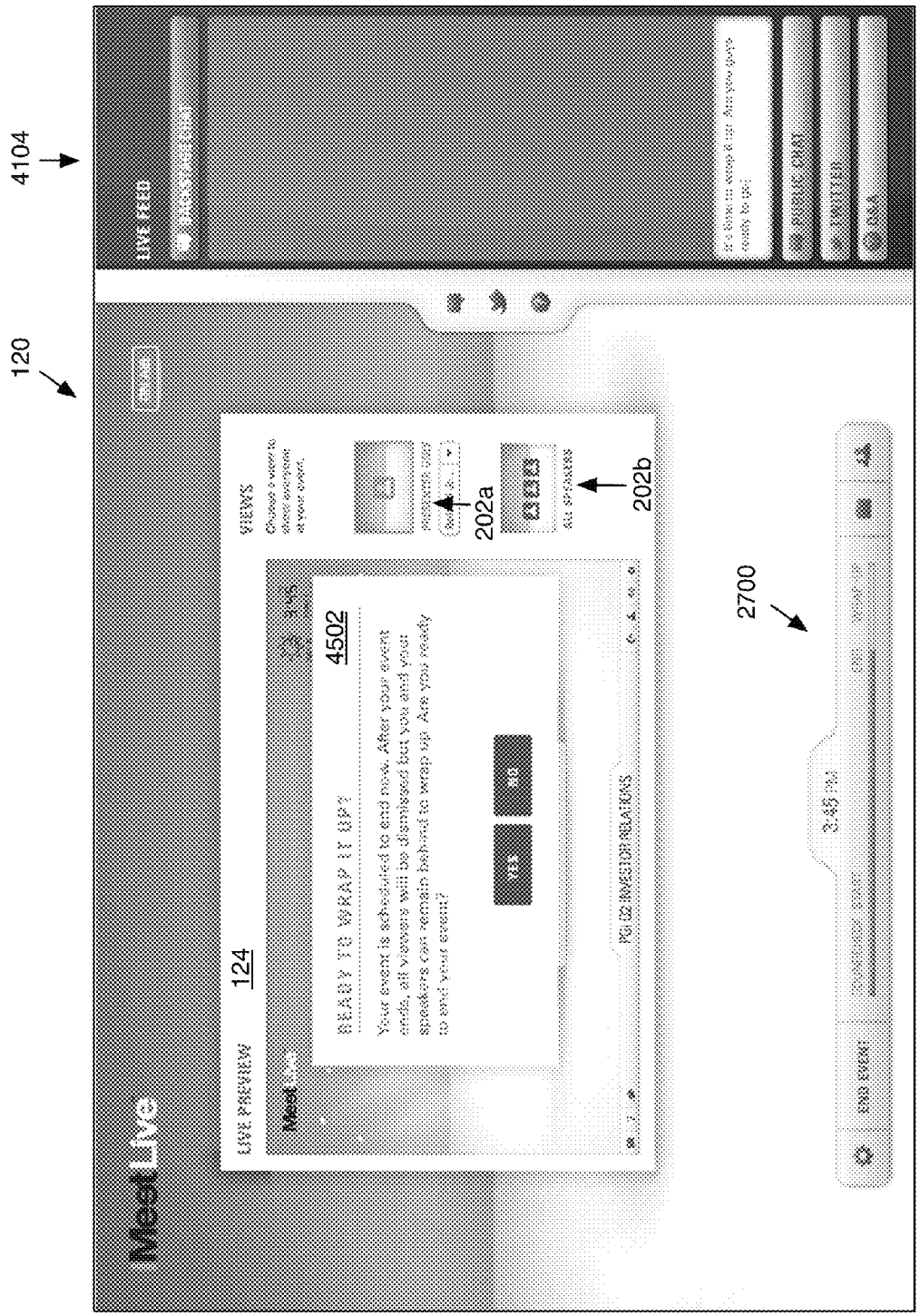
FIG. 45 is a screen shot illustrating an embodiment of the event production user interface for displaying a wrap-up production prompt.

In FIG. 45, after the online event 111 has ended, the event management/production module 118 may identify a wrap-up production prompt 2504i (FIG. 25). In response, the event production user interface 120 may display a window 4502 indicating that the speakers and the event producer will begin a post-event wrap-up.

Figure 46:
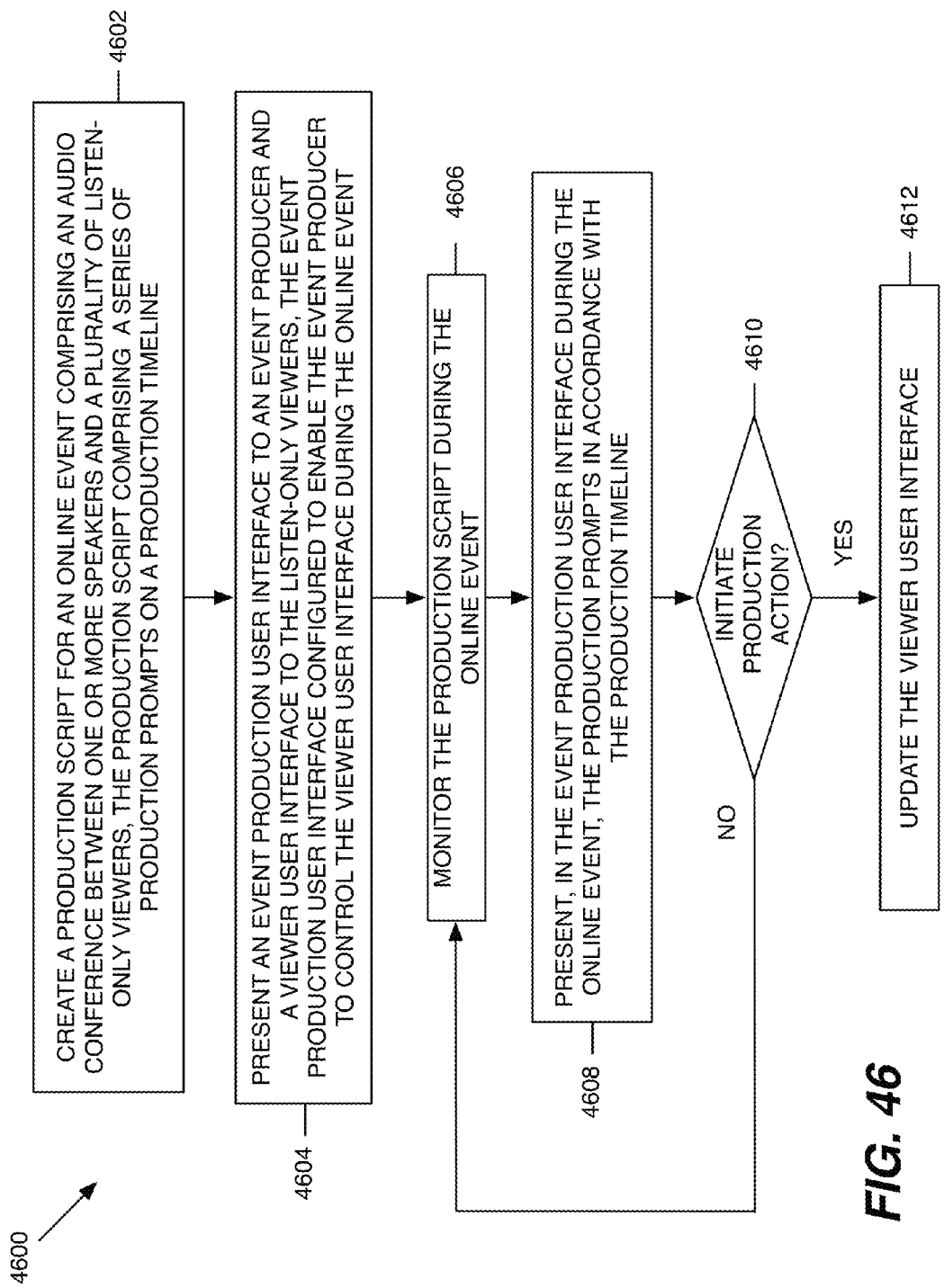
FIG. 46 is a flowchart illustrating an embodiment of the architecture, operation, and/or functionality of the event management/production system of FIG. 24.

FIG. 46 illustrates a method 4600 that may be executed by the system 2400 for implementing the production script and control functions described above. At block 4602, the event producer 106 creates the event production script 2406 using, for example, the production script generator tool 3600 (FIGS. 36 & 37). As illustrated in FIG. 25, the event production script 2406 may comprise a series 2502 of production prompts 2504 along a production timeline 2506. At block 4604, during the online event 111, the event management/production module(s) 118 presents the event production user interface 120 to the event producer 106 and the viewer user interface 124 to the listen-only viewers 110. During the online event 111, at block 4606, the event production script 2406 is monitored, executed, or otherwise implemented. At block 4608, based on the event production script 2406, the event production user interface 120 presents the production prompts 2504 in accordance with the production timeline 2506. At decision block 4610, it is determined whether the corresponding production action should be initiated (e.g., either automatically or as confirmed by the event producer 106). If the production action is to be initiated, the viewer user interface 124 is updated at block 4612. If the production action is not to be initiated (e.g., delayed, ignored, etc.), the process flow returns to block 4606 to monitor the event production script 2406.

It should be appreciated that one or more of the process or method descriptions associated with the flow charts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the computer system 100. Furthermore, the logical functions may be embodied in any computer readable medium for use by or in connection with an instruction execution system, apparatus, or device, such as a computer-based system, processor-containing system, or other system associated with the computer system 100 that can fetch the instructions from the instruction execution system, apparatus, or device and execute the instructions.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for producing an online event, the method comprising:
   creating a production script for an online event comprising an audio conference between one or more speakers and a plurality of listen-only viewers, the production script comprising a series of production prompts associated with a production timeline;

a server presenting an event production user interface to an event producer and a viewer user interface to the listen-only viewers, the event production user interface configured to selectively control the viewer user interface during the online event; and presenting, in the event production user interface, the production prompts in accordance with the production timeline during the online event.

2. The method of claim 1, wherein the production prompts comprise one or more of a pre-event soundcheck of the one or more speakers, an event start prompt, a speaker prompt, a play media prompt, a share document prompt, an agenda item prompt, a question-and-answer prompt, a launch application prompt, an event end prompt, and a post-event wrap-up prompt.

3. The method of claim 1, wherein the production prompt comprises a production control for initiating a corresponding production action.

4. The method of claim 1, wherein the production prompts are displayed in the event production user interface on the production timeline.

5. The method of claim 1, further comprising: initiating a production action associated with the production prompt.

6. The method of claim 5, wherein the production action is initiated automatically.

7. The method of claim 5, wherein the production action is confirmed by the event producer.

8. The method of claim 5, further comprising: updating the viewer user interface based on the production action.

9. A computer program embodied in a non-transitory computer readable medium and executable by a processor for producing an online event, the computer program comprising logic configured to:

create a production script for an online event comprising an audio conference between one or more speakers and a plurality of listen-only viewers, the production script comprising a series of production prompts associated with a production timeline;

present an event production user interface to an event producer and a viewer user interface to the listen-only viewers, the event production user interface configured to selectively control the viewer user interface during the online event; and present, in the event production user interface, the production prompts in accordance with the production timeline during the online event.

10. The computer program of claim 9, wherein the production prompts comprise one or more of a pre-event soundcheck of the one or more speakers, an event start prompt, a speaker prompt, a play media prompt, a share document prompt, an agenda item prompt, a question-and-answer prompt, a launch application prompt, an event end prompt, and a post-event wrap-up prompt.

11. The computer program of claim 9, wherein the production prompt comprises a production control for initiating a corresponding production action.

12. The computer program of claim 9, wherein the production prompts are displayed in the event production user interface on the production timeline.

13. The computer program of claim 9, further comprising logic configured to: initiate a production action associated with the production prompt.

14. The computer program of claim 13, wherein the production action is initiated automatically.

15. The computer program of claim 13, wherein the production action is confirmed by the event producer.

16. The computer program of claim 13, further comprising: updating the viewer user interface based on the production action.

17. A computer system comprising:

a conferencing system for establishing an audio conference between a plurality of listen-only viewers, an event producer, and one or more speakers, each operating a corresponding computing device connected via a communication network; and a server configured to communicate with the conferencing system and the computing devices, the server comprising one or more processors and an event management/production module, which is stored in memory and executed by the processors, the event management/production module comprising logic configured to:

create a production script for an online event associated with the audio conference, the production script comprising a series of production prompts associated with a production timeline;

present an event production user interface to an event producer and a viewer user interface to the listen-only viewers, the event production user interface configured to selectively control the viewer user interface during the online event; and present, in the event production user interface, the production prompts in accordance with the production timeline during the online event.

18. The computer system of claim 17, wherein the production prompts comprise one or more of a pre-event soundcheck of the one or more speakers, an event start prompt, a speaker prompt, a play media prompt, a share document prompt, an agenda item prompt, a question-and-answer prompt, a launch application prompt, an event end prompt, and a post-event wrap-up prompt.

19. The computer system of claim 17, wherein the production prompt comprises a production control for initiating a corresponding production action.

20. The computer system of claim 17, wherein the production prompts are displayed in the event production user interface on the production timeline.

21. The computer system of claim 17, wherein the event management/production module further comprises: logic configured to initiate a production action associated with the production prompt.

22. The computer system of claim 21, wherein the production action is initiated automatically.

23. The computer system of claim 21, wherein the production action is confirmed by the event producer.

24. The computer system of claim 21, wherein the event management/production module further comprises: logic configured to update the viewer user interface based on the production action.

* * * * *